(12) United States Patent
Divens-Dutcher et al.

(10) Patent No.: US 8,956,436 B2
(45) Date of Patent: *Feb. 17, 2015

(54) CORDIERITE ALUMINUM MAGNESIUM TITANATE COMPOSITIONS AND CERAMIC ARTICLES COMPRISING SAME

(71) Applicant: Corning Incorporated, Corning, NY (US)

(72) Inventors: Adriane Marie Divens-Dutcher, Painted Post, NY (US); Patrick David Tepesch, Corning, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/676,567

(22) Filed: Nov. 14, 2012

(65) Prior Publication Data

US 2013/0111862 A1    May 9, 2013

Related U.S. Application Data

(63) Continuation-in-part of application No. 13/584,993, filed on Aug. 14, 2012, now Pat. No. 8,673,045, which is a continuation of application No. 12/305,767, filed as application No. PCT/US2007/014864 on Jun. 27, 2007, now Pat. No. 8,394,167.

(60) Provisional application No. 60/817,723, filed on Jun. 30, 2006.

(51) Int. Cl.
  *B01D 50/00*   (2006.01)
  *B01D 39/06*   (2006.01)
  (Continued)

(52) U.S. Cl.
  CPC ............ *C04B 35/44* (2013.01); *B01D 39/2068* (2013.01); *C04B 35/195* (2013.01);
  (Continued)

(58) Field of Classification Search
  CPC .............. B01D 2046/2496; B01D 225/20746; B01D 39/1623; F01N 3/0222; B01J 2523/00; Y02T 10/22; C04B 38/0006
  USPC ............. 55/522–524; 422/169–172, 177–182
  See application file for complete search history.

(56) References Cited

U.S. PATENT DOCUMENTS 2,920,971 A    1/1960   Stookey .......................... 106/39
3,531,307 A *  9/1970   Bleecher et al. ............... 501/119
(Continued)

FOREIGN PATENT DOCUMENTS

CN    1277173     12/2000
EP    0 724 126   7/1996
(Continued)

OTHER PUBLICATIONS

Tsetsekou, Athena, "A comparison study of tialite ceramics doped with various oxide materials and tialite-mullite composites: microstructural, thermal and mechanical properties", Journal of the European Ceramic Society, 25 (2005), p. 335-348.
(Continued)

*Primary Examiner* — Amber Orlando
(74) *Attorney, Agent, or Firm* — Charles A. Greene

(57) ABSTRACT

Disclosed are ceramic bodies comprised of composite cordierite aluminum magnesium titanate ceramic compositions and methods for the manufacture of same.

25 Claims, 7 Drawing Sheets

(51) Int. Cl.
*B01D 39/14* (2006.01)
*B01D 39/20* (2006.01)
*B01D 24/00* (2006.01)
*C04B 35/44* (2006.01)
*C04B 35/195* (2006.01)
*C04B 35/468* (2006.01)

(52) U.S. Cl.
CPC ....... *C04B35/468* (2013.01); *C04B 2235/3206* (2013.01); *C04B 2235/3217* (2013.01); *C04B 2235/3222* (2013.01); *C04B 2235/3225* (2013.01); *C04B 2235/3227* (2013.01); *C04B 2235/3229* (2013.01); *C04B 2235/3232* (2013.01); *C04B 2235/3234* (2013.01); *C04B 2235/3236* (2013.01); *C04B 2235/3418* (2013.01); *C04B 2235/3463* (2013.01); *C04B 2235/3481* (2013.01); *C04B 2235/349* (2013.01); *C04B 2235/5436* (2013.01); *C04B 2235/5445* (2013.01); *C04B 2235/6021* (2013.01); *C04B 2235/656* (2013.01); *C04B 2235/6567* (2013.01); *C04B 2235/80* (2013.01); *C04B 2235/9607* (2013.01); *C04B 2235/9615* (2013.01)
USPC ................ 55/523; 55/522; 55/524; 422/169; 422/170; 422/171; 422/172; 422/177; 422/178; 422/179; 422/180; 422/181; 422/182

(56) References Cited

U.S. PATENT DOCUMENTS

| | | | | |
|---|---|---|---|---|
| 4,118,240 | A | 10/1978 | Takabatake | 106/73.3 |
| 4,304,603 | A | 12/1981 | Grossman et al. | 501/9 |
| 4,307,198 | A | 12/1981 | Oda et al. | 501/119 |
| 4,327,188 | A | 4/1982 | Endo et al. | 501/134 |
| 4,483,944 | A | 11/1984 | Day et al. | 502/439 |
| 4,767,731 | A | 8/1988 | Asami et al. | 501/128 |
| 4,855,265 | A | 8/1989 | Day et al. | 501/128 |
| 4,900,703 | A | 2/1990 | Ono et al. | 501/136 |
| 5,153,153 | A | 10/1992 | Freudenberg et al. | 501/127 |
| 5,290,739 | A | 3/1994 | Hickman | 501/128 |
| 5,346,870 | A | 9/1994 | Noguchi et al. | 501/135 |
| 5,491,116 | A | 2/1996 | Beall et al. | 501/5 |
| 6,403,019 | B1 | 6/2002 | Fukuda et al. | 264/658 |
| 6,849,181 | B2 | 2/2005 | Ogunwumi et al. | |
| 7,011,788 | B2 | 3/2006 | Fukuda et al. | 264/674 |
| 7,148,168 | B2 | 12/2006 | Fukuda et al. | 501/134 |
| 7,166,552 | B2 | 1/2007 | Fukuda et al. | 401/136 |
| 7,294,164 | B2 | 11/2007 | Merkel | |
| 8,394,167 | B2 * | 3/2013 | Merkel et al. | 55/523 |
| 8,673,045 | B2 * | 3/2014 | Merkel et al. | 55/523 |
| 2002/0081255 | A1 | 6/2002 | Cutler et al. | 423/213.5 |
| 2004/0092381 | A1 | 5/2004 | Beall et al. | 501/134 |
| 2006/0021308 | A1 | 2/2006 | Merkel | |
| 2006/0021309 | A1 | 2/2006 | Merkel | 55/523 |
| 2006/0239880 | A1 | 10/2006 | Fukuda et al. | 423/213.2 |
| 2007/0059484 | A1 | 3/2007 | Fukuda et al. | 428/116 |
| 2007/0163219 | A1 | 7/2007 | Fukuda et al. | 55/523 |
| 2007/0224110 | A1 | 9/2007 | Fukuda et al. | 423/598 |
| 2007/0261378 | A1 | 11/2007 | Miao et al. | 55/523 |
| 2007/0281850 | A1 * | 12/2007 | Beall | 501/9 |

FOREIGN PATENT DOCUMENTS

| | | |
|---|---|---|
| GB | 1 081 142 | 8/1967 |
| JP | S57-003767 | 1/1982 |
| JP | 57-145073 | 9/1982 |
| JP | S60-141668 | 7/1985 |
| JP | 63-197551 | 8/1988 |
| JP | H01-167282 | 6/1989 |
| JP | 2-311360 | 12/1990 |
| JP | H02-311360 | 12/1990 |
| JP | 6-40766 | 2/1994 |
| JP | 6-56551 | 3/1994 |
| JP | 2005/105704 | 11/2005 |
| JP | 2005-534474 | 11/2005 |
| JP | 2008-508185 | 3/2008 |
| WO | 2008005249 | 1/2008 |

OTHER PUBLICATIONS

Pavikov, V. N., et al., "Oxide ceramic materials on the basis of compositions with low thennal expansion", Science for Materials in the Frontier of Centuries: Advantages and Challenges, International Conference, Kyiv, Ukraine, Nov. 4-8, 2002 (2002), 2, Abstract.
Japan Patent Office, issued Mar. 27, 2012, Issue No. 207735, "Notice of Grounds for Rejection", pp. 1-3.
The State Intellectual Property Office of the People's Republic of China, date of dispatch May 25, 2011, Notice on the First Office Action (PCT Application in the National Phase), pages Patent Office, pp. 1-6.

* cited by examiner

US 8,956,436 B2

CORDIERITE ALUMINUM MAGNESIUM TITANATE COMPOSITIONS AND CERAMIC ARTICLES COMPRISING SAME

CROSS-REFERENCE TO RELATED APPLICATIONS

This application is a continuation-in-part of and claims the benefit of priority to U.S. patent application Ser. No. 13/584,993, filed on Aug. 14, 2012, which is a continuation of and claims the benefit of priority to U.S. patent application Ser. No. 12/305,767, filed on Dec. 19, 2008, both of which are hereby incorporated by reference for all purposes as if fully set forth herein.

BACKGROUND OF THE INVENTION

This application claims the benefit of U.S. Provisional Application No. 60/817,723, filed Jun. 30, 2006, entitled "Cordierite Aluminum Magnesium Titanate Compositions and Ceramic Articles Comprising Same."

FIELD OF THE INVENTION

The present invention relates to ceramic compositions and, more particularly, to composite ceramic compositions comprised of cordierite aluminum magnesium titanate.

TECHNICAL BACKGROUND

Refractory materials with low thermal expansion, and consequently high thermal shock resistance, are used in applications such as catalytic converter substrates and diesel particulate filters where high thermal gradients exist during use. One of the best materials for these applications is cordierite due to its low thermal expansion, high melting point, and low cost. In the diesel particulate filter area, it has been recognized that higher heat capacity is desirable for improving durability of filters during regeneration (Hickman SAE). A material with a high volumetric heat capacity is desirable in order to lower the volume of material necessary to absorb a given amount of heat. Less material volume is desirable because this can reduce pressure drop in the exhaust stream and increase the open volume for ash storage. However, low thermal expansion is still required. Aluminum titanate is one of the few materials that can be made with low thermal expansion and also has higher volumetric heat capacity than cordierite.

Aluminum titanate (AT) and composites containing large fractions of aluminum titanate have several disadvantages. First, pure aluminum titanate is metastable below about 1200° C. Second, the thermal expansion of AT is only low when the grain size is large and microcracks form during cooling in the kiln. These large grains and microcracks tend to make the material mechanically weak. Third, as a consequence of the microcracks, the thermal expansion curve can have very large hysteresis, leading to very high values of instantaneous thermal expansion, especially on cooling. Fourth, the firing temperature of AT-based composites is typically high, usually above 1400° C. Finally, AT has been shown to exhibit very high thermal cycling growth which can be exaggerated by the presence of alkali elements.

To slow down the decomposition rate, additives such as mullite, $MgTi_2O_5$, and $Fe_2TiO_5$ can be added to the aluminum titanate. $MgTi_2O_5$ tends to slow the decomposition rate in reducing conditions and only slows the rate in oxidizing conditions at high levels (>10%). $Fe_2TiO_5$ tends to slow the decomposition rate in oxidizing conditions and increase the decomposition rate in reducing conditions (U.S. Pat. No. 5,153,153, 1992).

Second phases such as mullite have been added to AT to increase the strength of the composite body, because microcracking generally does not occur between mullite crystals. Mullite also is a good choice because it also has a fairly high volumetric heat capacity. Other second phases have also been used in AT composites, including alkali and alkaline earth feldspars. However, mullite and alkali feldspars have a higher than optimum thermal expansion.

In an effort to provide a composite AT ceramic body having improved strength while maintaining a low CTE, cordierite would be a better choice than mullite as a second phase because cordierite has a lower coefficient of thermal expansion than does mullite. However, cordierite and pure aluminum titanate are not in thermodynamic equilibrium at any temperature. The provision of a cordierite and AT based composite ceramic having low CTE, high strength, and good thermal stability would represent an advancement in the state of the art. The present invention provides such a body.

SUMMARY OF THE INVENTION

The present invention relates to composite ceramic compositions comprising cordierite aluminum magnesium titanate. In one aspect, it provides a ceramic article comprising a first crystalline phase comprised predominantly of a solid solution of aluminum titanate and magnesium dititanate and a second crystalline phase comprising cordierite. In one embodiment, the solid solution phase of aluminum titanate and magnesium dititanate exhibits a pseudobrookite crystalline structure. In another embodiment, the ceramic article comprises a total porosity % P greater than 40% by volume.

In another aspect the invention includes a diesel particulate filter comprised of the inventive ceramic compositions summarized above. In one embodiment, the diesel particulate filter comprises a honeycomb structure having a plurality of axially extending end-plugged inlet and outlet cells.

In yet another aspect the invention provides a method for manufacturing the inventive composite cordierite aluminum magnesium titanate ceramic articles of the present invention. The method generally comprises first providing an inorganic batch composition comprising a magnesia source, a silica source, an alumina source, and a titania source. The inorganic batch composition is then mixed together with one or more processing aid(s) selected from the group consisting of a plasticizer, lubricant, binder, pore former, and solvent, to form a plasticized ceramic precursor batch composition. The plasticized ceramic precursor batch composition can be shaped or otherwise formed into a green body, optionally dried, and subsequently fired under conditions effective to convert the green body into a ceramic article.

An exemplary embodiment discloses an article comprising a composite composition of a solid solution of aluminum titanate and magnesium dititanate and a second crystalline phase comprising cordierite. The article has a composition, as expressed in weight percent on an oxide basis of from 4 to 10% MgO; from 40 to 55% $Al_2O_3$; from 25 to 35% $TiO_2$; from 5 to 25% $SiO_2$, and a metal oxide sintering aid, the metal oxide sintering aid comprising a lanthanide oxide.

An exemplary embodiment also discloses a diesel particulate filter comprised of a composite composition of a solid solution of aluminum titanate and magnesium dititanate and a second crystalline phase comprising cordierite. The particulate filter has a composition, as expressed in weight percent on an oxide basis of from 4 to 10% MgO; from 40 to 55%

$Al_2O_3$; from 25 to 35% $TiO_2$; from 5 to 25% $SiO_2$, and a metal oxide sintering aid, the metal oxide sintering aid comprising a lanthanide oxide. In an exemplary embodiment the diesel particulate filter comprises a honeycomb structure having a plurality of axially extending end-plugged inlet and outlet cells.

An exemplary embodiment also discloses a method for manufacturing a composite cordierite aluminum magnesium titanate ceramic article. The method includes compounding an inorganic batch composition comprising a magnesia source, a silica source, an alumina source, a titania source, and at least one metal oxide sintering aid, wherein the metal oxide sintering aid comprises a lanthanide oxide. Mixing the inorganic batch composition together with one or more processing aid selected from the group consisting of a plasticizer, lubricant, binder, pore former, and solvent, to form a plasticized ceramic precursor batch composition. Shaping the plasticized ceramic precursor batch composition into a green body. The method includes firing the green body under conditions effective to convert the green body into a ceramic article comprising a first crystalline phase comprised predominantly of a solid solution of aluminum titanate and magnesium dititanate and a second crystalline phase comprising cordierite.

An exemplary embodiment also discloses an article comprising a pseudobrookite phase comprising predominately aluminia, magnesia, and titania, a second phase comprising cordierite, and a sintering aid. The sintering aid includes at least one of a lanthanide oxide and yttrium oxide.

It is to be understood that both the foregoing general description and the following detailed description are exemplary and explanatory and are intended to provide further explanation of the invention as claimed.

BRIEF DESCRIPTION OF THE FIGURES

The invention is further described below with reference to the appended drawings, wherein.

DETAILED DESCRIPTION

Figure 1:
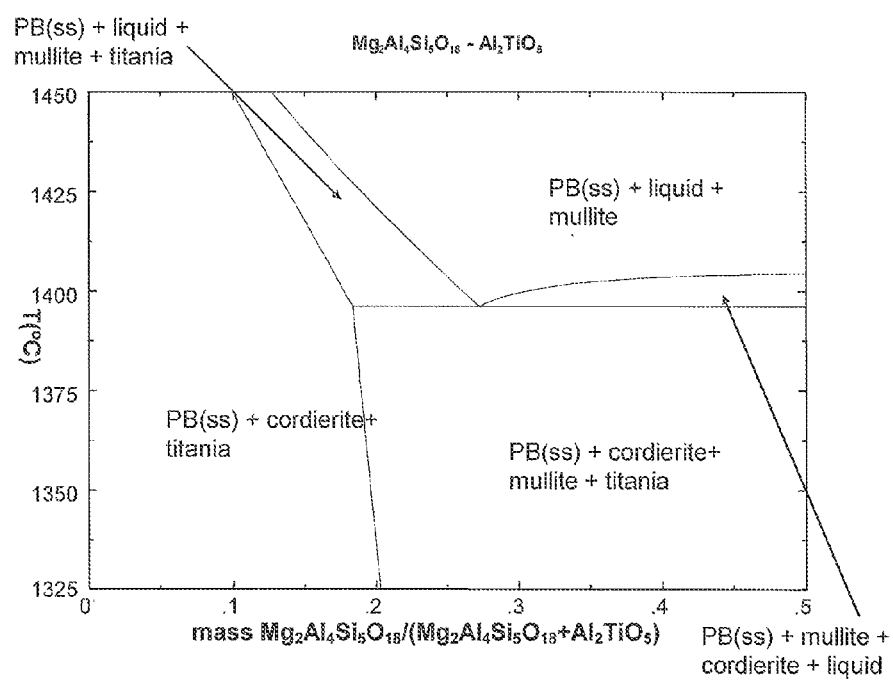
FIG. 1 depicts the stable combination of phases as a function of temperature and composition along the pseudo-binary join between aluminum titanate ($Al_2TiO_5$) and cordierite ($Mg_2Al_4Si_5O_{18}$).

As briefly summarized above, in one embodiment the present invention provides a composite ceramic body comprising a first crystalline phase comprised predominantly of a solid solution of aluminum titanate and magnesium dititanate ($MgTi_2O_5$—$Al_2TiO_5$) and a second crystalline phase comprising cordierite. The compositions of the ceramic bodies can be characterized as comprising, when expressed on weight percent oxide basis: from 4 to 10% MgO; from 40 to 55% $Al_2O_3$; from 25 to 44% $TiO_2$; from 5 to 25% $SiO_2$, from 0 to 5% $Y_2O_3$, from 0 to 5% $La_2O_3$, and from 0 to 3% $Fe_2O_3$. In these or still other embodiments, the compositions of the ceramic bodies of the invention are expressed in terms of weight fractions of oxides and oxide combinations to comprise, on an oxide basis, $a(Al_2TiO_5)+b(MgTi_2O_5)+c(2MgO.2Al_2O_3.5SiO_2)+d(3Al_2O_3.2SiO_2)+e(MgO.Al_2O_3)+f(2MgO.TiO_2)+g(Y_2O_3)+h(La_2O_3)+i(Fe_2O_3.TiO_2)+j(TiO_2)$, wherein a, b, c, d, e, f, g, h, i, and j are weight fractions of each component such that $(a+b+c+d+e+f+g+h+i+j)=1.00$. To that end, the weight fraction of each component can be in the respective ranges as follows: $0.3 \le a \le 0.75$, $0.075 \le b \le 0.3$, $0.02 \le c \le 0.5$, $0.0 \le d \le 0.4$, $0.0 \le e \le 0.25$, $0.0 \le f \le 0.1$, $0.0 \le g \le 0.05$, $0.0 \le h \le 0.05$, $0.0 \le i \le 0.05$, and $0.0 \le j \le 0.20$. It will be recognized that the oxides and oxide combinations used to define the oxide compositions of these ceramics will not necessarily be present in the ceramic bodies as the corresponding free oxides or crystal phases, other than as those crystal phases are specifically identified herein as characteristic of these ceramics. It will also be recognized that while the sum of a, b, c, d, e, f, g, h, and i is 1.00, it is the ratio of oxides and oxide combinations that are expressed. That is, the composite ceramic body may include other impurities in addition to the ratio of oxides and oxide combinations expressed. This will be apparent in view of the examples disclosed below.

The solid solution aluminum titanate and magnesium dititanate phase preferably exhibits a pseudobrookite crystal structure. To that end, the composition of the pseudobrookite phase can depend upon the processing temperature as well as the overall bulk composition of the ceramic and, as such, can be determined by an equilibrium condition. However, in one embodiment, the composition of the pseudobrookite phase comprises from approximately 15% to 35% $MgTi_2O_5$ by weight. Still further, while the total volume of the pseudobrookite phase can also vary, in another embodiment, the total volume is preferably in the range of from 50 to 95 volume % of the overall ceramic composition.

Optionally, the composite ceramic body can further comprise one or more phases selected from the group consisting of mullite, sapphirine, a titania polymorph such as rutile or anatase, corundum, and a spinel solid solution ($MgAl_2O_4$—$Mg_2TiO_4$). When present, the composition of the spinel phase will also depend on processing temperatures and overall bulk composition. However, in one embodiment, the spinel phase can comprise at least about 95% $MgAl_2O_4$.

Still further, the ceramic composition can also optionally comprise one or more metal oxide sintering aid(s) or additives provided to lower the firing temperature and broaden the firing window required to form the ceramic composition. A sintering aid can, for example, be present in an amount of from 0 to 5 weight percent of the total composition and can include, for example, one or more metal oxides such as $Fe_2TiO_5$, $Y_2O_3$, and $La_2O_3$. In one embodiment, yttrium oxide ($Y_2O_3$) and/or lanthanum oxide ($La_2O_3$) has been found to be a particularly good sintering additive when added in an amount of between 0.5 and 4.0 wt. %, and more preferably between 1.0 and 2.0 wt. %. To that end, the yttrium oxide or lanthanide oxide may be present as the oxide phase, or may form a new phase with one or more of the other metal oxide constituents of the ceramic body. Similarly, iron oxide from a suitable iron source, present as ferrous or ferric oxide or in combination with other oxides, e.g., as $Fe_2TiO_5$, can be present in some embodiments in an amount, calculated as $Fe_2TiO_5$, of from 0 to 3 weight % $Fe_2TiO_5$. The presence of $Fe_2TiO_5$ can be useful for slowing decomposition in oxidizing atmospheres. When both $Fe_2TiO_5$ and a spinel phase are present in the ceramic body, the spinel solid solution can also additionally contain ferrous and/or ferric iron in the solid solution.

According to a particular embodiment of the present invention, the ceramic body comprises approximately 10 to 25 wt. % cordierite, approximately 10 to 30 wt. % mullite, approximately 50 to 70 wt. % of a pseudobrookite phase consisting predominantly of an $Al_2TiO_5$—$MgTi_2O_5$ solid solution, and approximately 0.5 to 3.0 wt. % $Y_2O_3$ addition.

The ceramic bodies of the present invention can in some instances comprise a relatively high level of total porosity. For example, bodies comprising a total porosity, % P, of at least 40%, at least 45%, at least 50%, or even at least 60%, as determined by mercury porosimetry, can be provided.

In addition to the relatively high total porosities, ceramic bodies of the present invention can also comprise a relatively narrow pore size distribution evidenced by a minimized percentage of relatively fine and/or relatively large pore sizes. To this end, relative pore size distributions can be expressed by a pore fraction which, as used herein, is the percent by volume of porosity, as measured by mercury porosimetry, divided by 100. For example, the quantity $d_{50}$ represents the median pore size based upon pore volume, and is measured in micrometers; thus, $d_{50}$ is the pore diameter at which 50% of the open porosity of the ceramic sample has been intruded by mercury. The quantity $d_{90}$ is the pore diameter at which 90% of the pore volume is comprised of pores whose diameters are smaller than the value of $d_{90}$; thus, $d_{90}$ is also equal to the pore diameter at which 10% by volume of the open porosity of the ceramic has been intruded by mercury. Still further, the quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also expressed in units of micrometers.

The median pore diameter, $d_{50}$, of the pores present in the instant ceramic articles can, in one embodiment, be at least 10 μm, more preferably at least 14 μm, or still more preferably at least 16 μm. In another embodiment, the median pore diameter, $d_{50}$, of the pores present in the instant ceramic articles do not exceed 30 μm, and more preferably do not exceed 25 μm, and still more preferably do not exceed 20 μm. In still another embodiment, the median pore diameter, $d_{50}$, of the pores present in the instant ceramic articles can be in the range of from 10 μm to 30 μm, more preferably from 18 μm to 25 μm, even more preferably from 14 μm to 25 μm, and still more preferably from 16 μm to 20 μm. To this end, a combination of the aforementioned porosity values and median pore diameter values can provide low clean and soot-loaded pressure drop while maintaining useful filtration efficiency when the ceramic bodies of the present invention are used in diesel exhaust filtration applications.

The relatively narrow pore size distribution of the inventive ceramic articles can, in one embodiment, be evidenced by the width of the distribution of pore sizes finer than the median pore size, $d_{50}$, further quantified as pore fraction. As used herein, the width of the distribution of pore sizes finer than the median pore size, $d_{50}$, are represented by a "$d_{factor}$" or "$d_f$" value which expresses the quantity $(d_{50}-d_{10})/d_{50}$. To this end, the ceramic bodies of the present invention can comprises a $d_{factor}$ value that does not exceed 0.50, 0.40, 0.35, or even that does not exceed 0.30. In some preferred embodiments, the $d_{factor}$ value of the inventive ceramic body does not exceed 0.25 or even 0.20. To this end, a relatively low $d_f$ value indicates a low fraction of fine pores, and low values of $d_f$ can be beneficial for ensuring low soot-loaded pressure drop when the inventive ceramic bodies are utilized in diesel filtration applications.

The relatively narrow pore size distribution of the inventive ceramic articles can in another embodiment also be evidenced by the width of the distribution of pore sizes that are finer or coarser than the median pore size, $d_{50}$, further quantified as a pore fraction. As used herein, the width of the distribution of pore sizes that are finer or coarser than the median pore size, $d_{50}$, are represented by a "$d_{breadth}$" or "$d_B$" value which expresses the quantity $(d_{90}-d_{10})/d_{50}$. To this end, the ceramic structure of the present invention in one embodiment comprises a $d_b$ value that is less than 1.50, less than 1.25, less than 1.10, or even less than 1.00. In some especially preferred embodiments, the value of $d_b$ is not more than 0.8, more preferably not greater than 0.7, and even more preferably not greater than 0.6. A relatively low value of $d_b$ can provide a relatively higher filtration efficiency and higher strength for diesel filtration applications.

The ceramic bodies of the present invention can, in another embodiment, exhibit a low coefficient of thermal expansion resulting in excellent thermal shock resistance (TSR). As will be appreciated by one of ordinary skill in the art, TSR is inversely proportional to the coefficient of thermal expansion (CTE). That is, a ceramic body with low thermal expansion will typically have higher thermal shock resistance and can survive the wide temperature fluctuations that are encountered in, for example, diesel exhaust filtration applications. Accordingly, in one embodiment, the ceramic articles of the present invention are characterized by having a relatively low coefficient of thermal expansion (CTE) in at least one direction and as measured by dilatometry, that is less than or equal to about $25.0 \times 10^{-7}/°C$., less than or equal to $20.0 \times 10^{-7}/°C$.; less than or equal to $15.0 \times 10^{-7}/°C$., less than or equal to $10.0 \times 10^{-7}/°C$., or even less than or equal to $8.0 \times 10^{-7}/°C$., across the temperature range of from 25° C. to 1000° C.

Still further, it should be understood that embodiments of the present invention can exhibit any desired combination of the aforementioned properties. For example, in one embodiment, it is preferred that the CTE (25-1000° C.) does not exceed $12 \times 10^7/°C$. (and preferably not more than $10 \times 10^{-7}/°C$.), the porosity % P is at least 45%, the median pore diameter is at least 14 μm (and preferably at least 18 μm), and the value of $d_f$ is not more than 0.35 (and preferably not more than 0.30). It is further preferred that such exemplary ceramic bodies exhibit a value of $d_b$ that does not exceed 1.0, and more preferably that does not exceed 0.85, and still more preferably that does not exceed 0.75. In another exemplary embodiment, the CTE (25-1000° C.) does not exceed $18 \times 10^{-7}/°C$. and the porosity % P is at least 40%. For example, the CTE (25-1000° C.) does not exceed $18 \times 10^{-7}/°C$. and the porosity % P is at least 60%. In another example, CTE (25-1000° C.) does not exceed $12 \times 10^{-7}/°C$. and the porosity % P is at least 40%. In a further example, CTE (25-1000° C.) does not exceed $12 \times 10^{-7}/°C$. and the porosity % P is at least 60%.

The ceramic bodies of the present invention can have any shape or geometry suitable for a particular application. In high temperature filtration applications, such as diesel particulate filtration, for which the inventive bodies are especially suited, it is preferred the bodies to have a multicellular structure, such as that of a honeycomb monolith. For example, in an exemplary embodiment, the ceramic body can comprise a honeycomb structure having an inlet and outlet end or face, and a multiplicity of cells extending from the inlet end to the outlet end, the cells having porous walls. The honeycomb structure can further have cellular densities from 70 cells/in$^2$ (10.9 cells/cm$^2$) to 400 cells/in$^2$ (62 cells/cm$^2$). A portion of the cells at the inlet end or face end can, in one embodiment, be plugged with a paste having same or similar composition to that of the honeycomb structure, as described in U.S. Pat. No. 4,329,162 which is herein incorporated by reference. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. A preferred arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as "wall flow" filters since the flow paths resulting from alternate channel plugging require the exhaust being treated to flow through the porous ceramic cell walls prior to exiting the filter.

The present invention also provides a method of manufacturing the inventive composite cordierite aluminum magnesium titanate ceramic articles from a ceramic forming precursor batch composition comprised of certain inorganic powdered raw materials. Generally, the method first comprises providing an inorganic batch composition comprising a magnesia source, a silica source, an alumina source, and a titania source. The inorganic batch composition is then mixed together with one or more processing aid(s) selected from the group consisting of a plasticizer, lubricant, binder, pore former, and solvent, to form a plasticized ceramic precursor batch composition. The plasticized ceramic precursor batch composition can be shaped or otherwise formed into a green body, optionally dried, and subsequently fired under conditions effective to convert the green body into a ceramic article.

The magnesia source can, for example and without limitation, be selected from one or more of MgO, Mg(OH)$_2$, MgCO$_3$, MgAl$_2$O$_4$, Mg$_2$SiO$_4$, MgSiO$_3$, MgTiO$_3$, Mg$_2$TiO$_4$, MgTi$_2$O$_5$, talc, and calcined talc. Alternatively, the magnesia source can be selected from one or more of forsterite, olivine, chlorite, or serpentine. Preferably, the magnesia source has a median particle diameter that does not exceed 35 μm, and preferably that does not exceed 30 μm. To this end, as referred to herein, all particle diameters are measured by a laser diffraction technique such as by a Microtrac particle size analyzer.

The alumina source can, for example and without limitation, be selected from an alumina-forming source such as corundum, Al(OH)$_3$, boehmite, diaspore, a transition alumina such as gamma-alumina or rho-alumina. Alternatively, the alumina source can be a compound of aluminum with another metal oxide such as MgAl$_2$O$_4$, Al$_2$TiO$_5$, mullite, kaolin, calcined kaolin, phyrophyllite, kyanite, etc. In one embodiment, the weighted average median particle size of the alumina sources is preferably in the range of from 10 μm to 60 μm, and more preferably in the range of from 20 μm to 45 μm. In still another embodiment, the alumina source can be a combination of one or more alumina forming sources and one or more compounds of aluminum with another metal oxide.

The titania source can, in addition to the compounds with magnesium or alumina described above, be provided as TiO$_2$ powder.

The silica source can be provided as a SiO$_2$ powder such as quartz, cryptocrystalline quartz, fused silica, diatomaceous silica, low-alkali zeolite, or colloidal silica. Additionally, the silica source can also be provided as a compound with magnesium and/or aluminum, including for example, cordierite, chlorite, and the like. In still another embodiment, the median particle diameter of the silica source is preferably at least 5 μm, more preferably at least 10 μm, and still more preferably at least 20 μm.

As described above, one or more metal oxide sintering aid(s) or additives can optionally be added to the precursor batch composition to lower the firing temperature and broaden the firing window required to form the ceramic composition. The sintering aid can, for example, be present in an amount of from 0 to 5 weight percent of the total composition and can include, for example, one or more a metal oxides such as Fe$_2$TiO$_5$, Y$_2$O$_3$, and La$_2$O$_3$. In one embodiment, yttrium oxide (Y$_2$O$_3$) and/or or lanthanide oxide (La$_2$O$_3$) has been found to be a particularly good sintering additive when added in an amount of between 0.5 and 4.0 wt. %, and more preferably between 1.0 and 2.0 wt. %. Similarly, an addition of Fe$_2$TiO$_5$ can be useful for slowing decomposition in oxidizing atmospheres when added in an amount of from 0 to 3 weight %.

Still further, the ceramic precursor batch composition may comprise other additives such as surfactants, oil lubricants and pore-forming material. Non-limiting examples of surfactants that may be used as forming aids are C$_8$ to C$_{22}$ fatty acids, and/or their derivatives. Additional surfactant components that may be used with these fatty acids are C$_8$ to C$_{22}$ fatty esters, C$_8$ to C$_{22}$ fatty alcohols, and combinations of these. Exemplary surfactants are stearic, lauric, myristic, oleic, linoleic, palmitic acids, and their derivatives, tall oil, stearic acid in combination with ammonium lauryl sulfate, and combinations of all of these. In an illustrative embodiment, the surfactant is lauric acid, stearic acid, oleic acid, tall oil, and combinations of these. In some embodiments, the amount of surfactants is from about 0.25% by weight to about 2% by weight.

Non-limiting examples of oil lubricants used as forming aids include light mineral oil, corn oil, high molecular weight polybutenes, polyol esters, a blend of light mineral oil and wax emulsion, a blend of paraffin wax in corn oil, and combinations of these. In some embodiments, the amount of oil lubricants is from about 1% by weight to about 10% by weight. In an exemplary embodiment, the oil lubricants are present from about 3% by weight to about 6% by weight.

The precursor composition can, if desired, contain a pore-forming agent to tailor the porosity and pore size distribution in the fired body for a particular application. A pore former is a fugitive material which evaporates or undergoes vaporization by combustion during drying or heating of the green body to obtain a desired, usually higher porosity and/or coarser median pore diameter. A suitable pore former can include, without limitation, carbon; graphite; starch; wood, shell, or nut flour; polymers such as polyethylene beads; waxes; and the like. When used, a particulate pore former can have a median particle diameter in the range of from 10 μm to 70 μm, and more preferably from 20 μm to 50 μm.

The inorganic ceramic forming batch components, along with any optional sintering aid and/or pore former, can be intimately blended with a liquid vehicle and forming aids which impart plastic formability and green strength to the raw materials when they are shaped into a body. When forming is done by extrusion, most typically a cellulose ether binder such as methylcellulose, hydroxypropyl methylcellulose, methylcellulose derivatives, and/or any combinations thereof, serve as a temporary organic binder, and sodium stearate can serve as a lubricant. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 1% by weight sodium stearate, stearic acid, oleic acid or tall oil, and preferably about 0.6% by weight. The raw materials and the forming aids are typically mixed together in dry form and then mixed with water as the vehicle. The amount of water can vary from one batch of materials to another and therefore is determined by pre-testing the particular batch for extrudability.

The liquid vehicle component can vary depending on the type of material used in order to impart optimum handling properties and compatibility with the other components in the ceramic batch mixture. Typically, the liquid vehicle content is usually in the range of from 20% to 50% by weight of the plasticized composition. In one embodiment, the liquid vehicle component can comprise water. In another embodiment, depending on the component parts of the ceramic batch composition, it should be understood that organic solvents such as, for example, methanol, ethanol, or a mixture thereof can be used as the liquid vehicle.

Forming or shaping of the green body from the plasticized precursor composition may be done by, for example, typical ceramic fabrication techniques, such as uniaxial or isostatic pressing, extrusion, slip casting, and injection molding. Extrusion is preferred when the ceramic article is of a honeycomb geometry, such as for a catalytic converter flow-through substrate or a diesel particulate wall-flow filter. The resulting green bodies can be optionally dried, and then fired in a gas or electric kiln or by microwave heating, under conditions effective to convert the green body into a ceramic article. For example, the firing conditions effective to convert the green body into a ceramic article can comprise heating the green body at a maximum soak temperature in the range of from 1250° C. to 1450° C., for example, in the range of from 1300° C. to 1350° C., or in the range of from 1330° C. to 1380° C., and maintaining the maximum soak temperature for a hold time sufficient to convert the green body into a ceramic article, followed by cooling at a rate sufficient not to thermally shock the sintered article.

Still further, the effective firing conditions can comprise heating the green body at a first soak temperature in the range of from 1240 to 1350° C. (preferably 1270 to 1330° C.), holding the first soak temperature for a period of from 2 to 10 hours (preferably 4 to 8 hours), then heating the body at a second soak temperature in the range of from 1270 to 1450° C. (preferably 1300-1350° C.), and holding the second soak temperature for a period of from 2 to 10 hours (preferably 4 to 8 hours), again followed by cooling at a rate sufficient not to thermally shock the sintered article.

To obtain a wall-flow filter, a portion of the cells of the honeycomb structure at the inlet end or face are plugged, as known in the art. The plugging is only at the ends of the cells which is typically to a depth of about 1 to 20 mm, although this can vary. A portion of the cells on the outlet end but not corresponding to those on the inlet end are plugged. Therefore, each cell is plugged only at one end. The preferred arrangement is to have every other cell on a given face plugged in a checkered pattern.

A greater understanding of the findings underlying the present invention can be obtained with reference to phase equilibrium diagrams for the $MgO$—$Al_2O_3$—$TiO_2$—$SiO_2$ system, prepared by the present inventors. It will of course be recognized that many of the boundaries between phase fields included in such diagrams represent the results of equilibrium calculations and extrapolation rather than actual phase analyses. While the phase fields themselves have been confirmed with experiments, the precise temperatures and compositions representing boundaries between phase fields are approximate. In any case, the phase diagram of FIG. 1 depicts the stable combination of phases as a function of temperature and composition along the pseudo-binary join between aluminum titanate ($Al_2TiO_5$) and cordierite ($Mg_2Al_4Si_5O_{18}$). Essentially, this diagram indicates that mixtures of cordierite and AT at high temperature will tend to form other phases, including mullite, titania, liquid, and a solid-solution phase with the pseudobrookite crystal structure.

Figure 2:
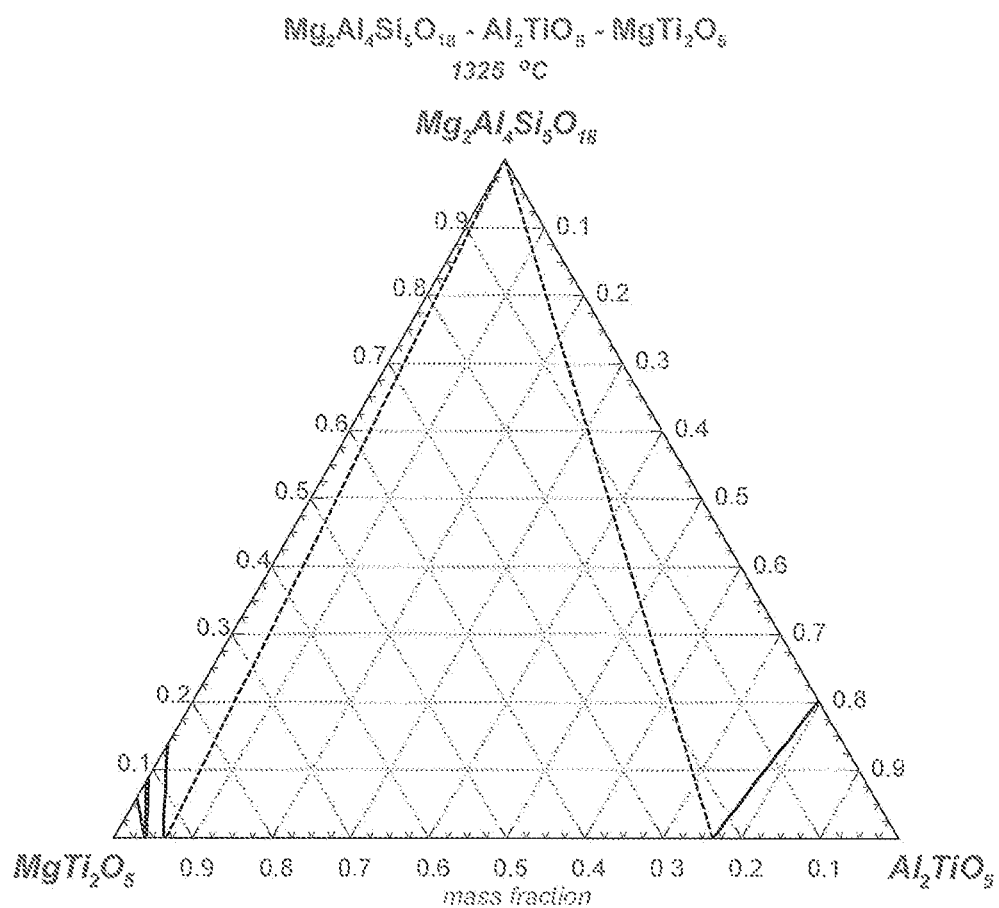
FIG. 2 depicts the phase relations at 1300° C. in the ternary section with endpoints of magnesium dititanate, aluminum titanate, and cordierite within the quaternary MgO—$Al_2O_3$—$TiO_2$—$SiO_2$ system.

Two significant features can be derived from a study of this diagram. First, in order for the pseudobrookite phase to be in equilibrium with cordierite there is a general restriction on the composition of the solid-solution, in particular, pure AT will tend to not exist in equilibrium with cordierite. FIG. 2 depicts the phase relations at 1325° C. in the ternary section with endpoints of magnesium dititanate, aluminum titanate, and cordierite within the quaternary $MgO$—$Al_2O_3$—$TiO_2$—$SiO_2$ system, showing that the pseudobrookite phase in equilibrium with cordierite contains at least about 25 wt % magnesium dititanate at this temperature. Second, FIG. 1 shows that a liquid appears in the diagram at fairly low temperatures (~1390° C., although the lowest eutectic liquid in this system exists well below this).

According to another exemplary embodiment the sintering aid can include cerium oxide ($CeO_2$) or cerium oxide in combination with one or more other metal oxides such as $Fe_2TiO_5$, $Y_2O_3$, and $La_2O_3$. For example, the sintering aid can include cerium oxide in combination with yttrium oxide, cerium oxide in combination with lanthanum oxide, or cerium oxide in combination with yttrium oxide and lanthanum oxide. The inventors have found that cerium oxide or mixtures of cerium oxide with one or more other metal oxides such as $Fe_2TiO_5$, yttrium oxide, and lanthanum oxide, result in similar CTE, porosity, pore size, and pore size distribution at lower rare earth cost than yttrium oxide alone.

In an exemplary embodiment the amount of cerium oxide can be in a range of 0.1 to 5.0 wt %. For example, the amount of cerium oxide can be in a range of 0.2 to 2.0 wt %, 0.3 to 1.0 wt %, and 1.5 to 2.5 wt %. As mentioned, in an exemplary embodiment the mixtures of cerium oxide with one or more other metal oxides such as $Fe_2TiO_5$, yttrium oxide, and lanthanum oxide can be a sintering aid. The amount of the mixture can be in a range of 0.1 to 5.0 wt %. For example, the amount of the mixture can be in a range of 0.3 to 4.0 wt %, 0.4 to 2.5 wt %, 0.5 to 1.5 wt %, and 2.5 to 4.5 wt %.

EXAMPLES

The invention is further described below with respect to certain exemplary and specific embodiments thereof, which are illustrative only and not intended to be limiting. In accordance with some of the examples, a series of inventive ceramic articles is prepared having the general inorganic batch composition as provided in Table 1, in terms of the weight percentages of the end-member phases, and as provided in Table 2, expressed in terms of the weight percentages of the single component oxides, excluding any sintering additive.

TABLE 1

| Formula | Name | Weight % |
|---|---|---|
| $Al_2TiO_5$ | AT | 40 |
| $MgTi_2O_5$ | MT2 | 20 |
| $Al_6Si_2O_{13}$ | Mullite | 25 |
| $Mg_2Al_4Si_5O_{18}$ | Cordierite | 15 |

TABLE 2

| Metal Oxide | Weight % |
|---|---|
| MgO | 6.10 |
| $Al_2O_3$ | 45.61 |
| $TiO_2$ | 33.54 |
| $SiO_2$ | 14.76 |

Tables 3 to 11 and 13 provide data for the inventive examples fabricated according to the general composition of Tables 1 and 2. Listed are the raw materials, pore formers, and sintering aid (median particle diameters in parentheses) used to make the samples. The examples provided have been made by mulling component powders with water and an organic binder, followed by extrusion, drying, and firing. Extruded samples were wrapped in foil and hot-air dried or microwave dried. Some samples were made by pressing powder with no drying step as described below. Samples were subsequently fired in an electric kiln by heating at 60° C./hr to a first soak temperature and holding for 6 hours, then heated at 60° C./hr to a second soak temperature and held for another 6 hours. Soak temperatures are also provided in Tables 3 to 11 and 13. These examples will be discussed further below. All measurements, except where noted, were on cellular pieces with 200 cells per square inch and 406 μm (16 mil) wall thicknesses. All samples were fired in air in electric furnaces unless otherwise noted. CTE was measured parallel to the honeycomb channels by dilatometry. Porosity and pore size distribution were derived from mercury porosimetry measurements.

Also provided in Tables 3 to 11 and 13 is the "maximum ΔL at 1000° C.," defined as the value of ΔL/L at 1000° C. due to thermal expansion upon heating a thermal expansion specimen to 1000° C. from room temperature, minus the minimum value of ΔL/L that occurs during cooling of a thermal expansion specimen from 1000° C. to that lower temperature at which the minimum value of ΔL/L exists. The values of maximum ΔL at 1000° C. are reported in Tables 3 to 11 and 13 as a percentage value; thus, for example, a maximum ΔL at 1000° C. of 0.15% is equal to a ΔL value of $0.15 \times 10^{-2}$, which is also equivalent to 1500 ppm, or $1500 \times 10^{-6}$ inches/inch. The value of maximum ΔL at 1000° C. is a measure of the degree of hysteresis between the thermal expansion curves (ΔL/L vs. temperature) during heating and cooling.

In addition to measurement of the property data in Tables 3 to 11 and 13, several special measurements were made to characterize the thermal stability of the inventive materials, and to determine their pressure drop behavior when used as a diesel particulate filter.

Figure 3:
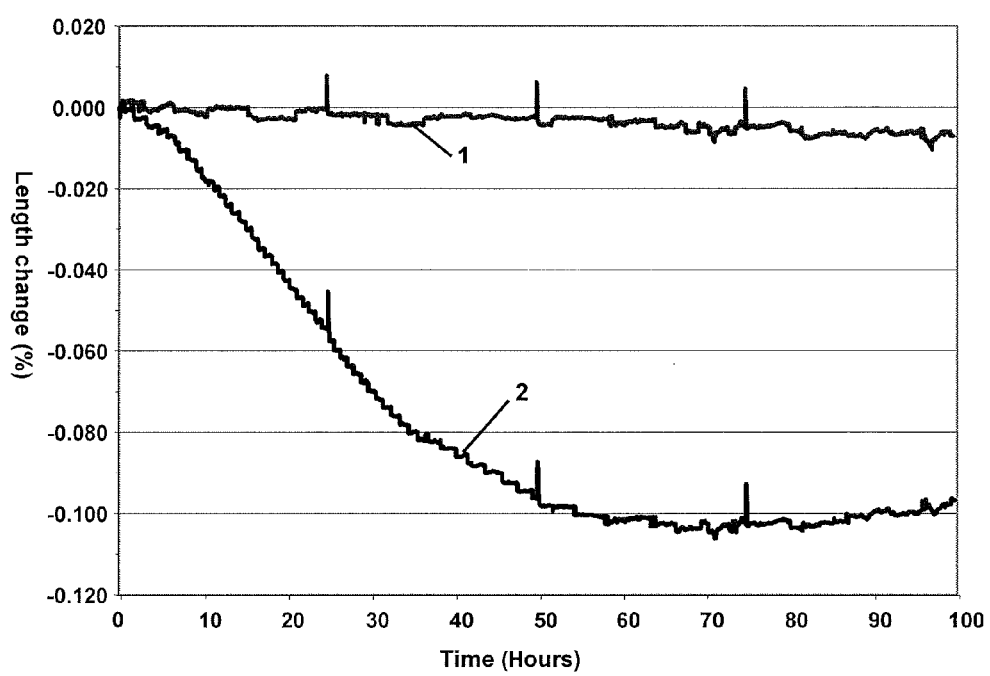
FIG. 3 illustrates the change in length as a function of time at 1100° C. for a control aluminum titanate ceramic composition and for a composition in the cordierite/mullite/pseudobrookite region of the phase diagram.
Figure 4:
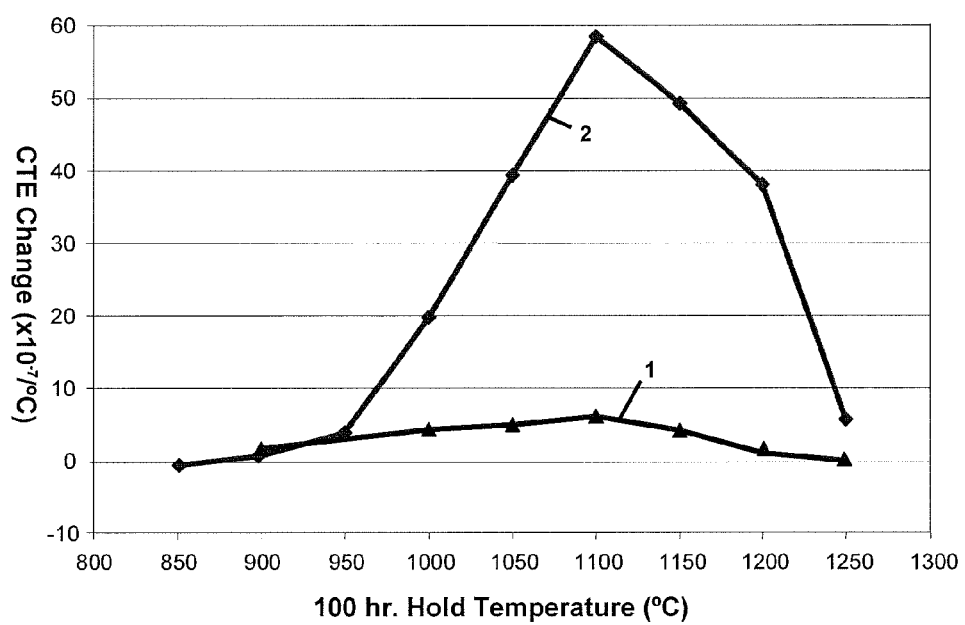
FIG. 4 demonstrates the change in the 25-1000° C. coefficient of thermal expansion for a control aluminum titanate ceramic composition and the cordierite/mullite/pseudobrookite composition of Table 1 after 100 hours at temperatures of from 950 to 1250° C.

The thermal stability (decomposition rate) was assessed by two methods. In the first method, specimens of the inventive body and of a control aluminum titanate composition were held at 1100° C. and their lengths monitored over time for up to 100 hours. Decomposition of the pseudobrookite phase is accompanied by a decrease in volume (shrinkage, or negative length change). The results, shown in FIG. 3, demonstrate the superior stability of the inventive body, for which the decomposition rate of the pseudobrookite phase is at least 10 times slower than for the control aluminum titanate composition. In a second method to assess decomposition rate, the CTE of the inventive composition and control aluminum titanate composition was measured before and after isothermally holding the sample for 100 hours at temperatures of from 950 to 1250° C. Because the decomposition of the pseudobrookite phase reduces the amount of microcracking, raising the CTE, the increase in CTE after heat treatment is an indication of the degree of decomposition. The results are shown in FIG. 4, and demonstrate the improved thermal stability of the inventive bodies.

Figure 5:
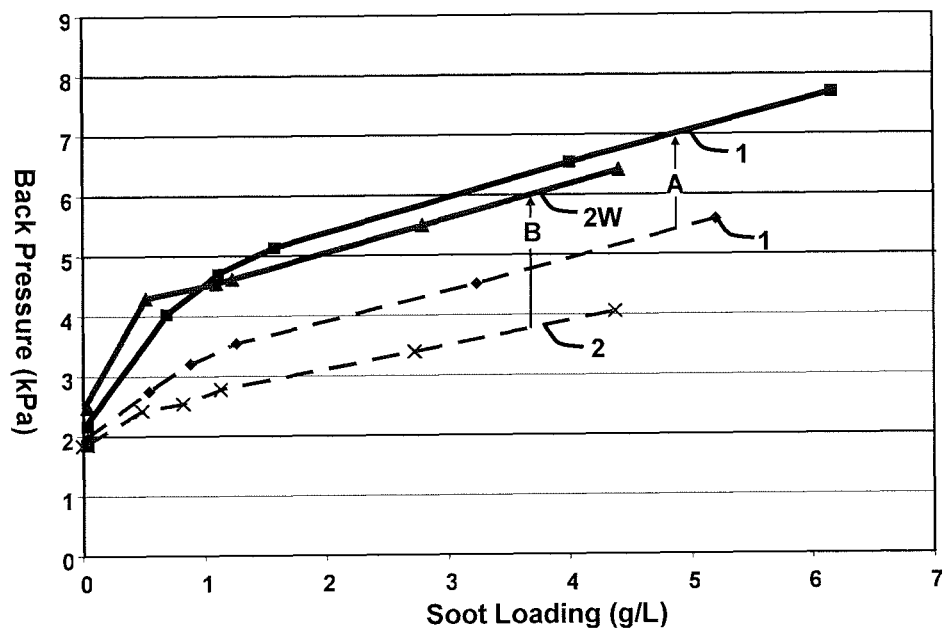
FIG. 5 shows representative data for pressure drop as a function of soot loading for a cordierite/mullite/pseudobrookite ceramic wall flow filter made in accordance with the invention.
Figure 6:
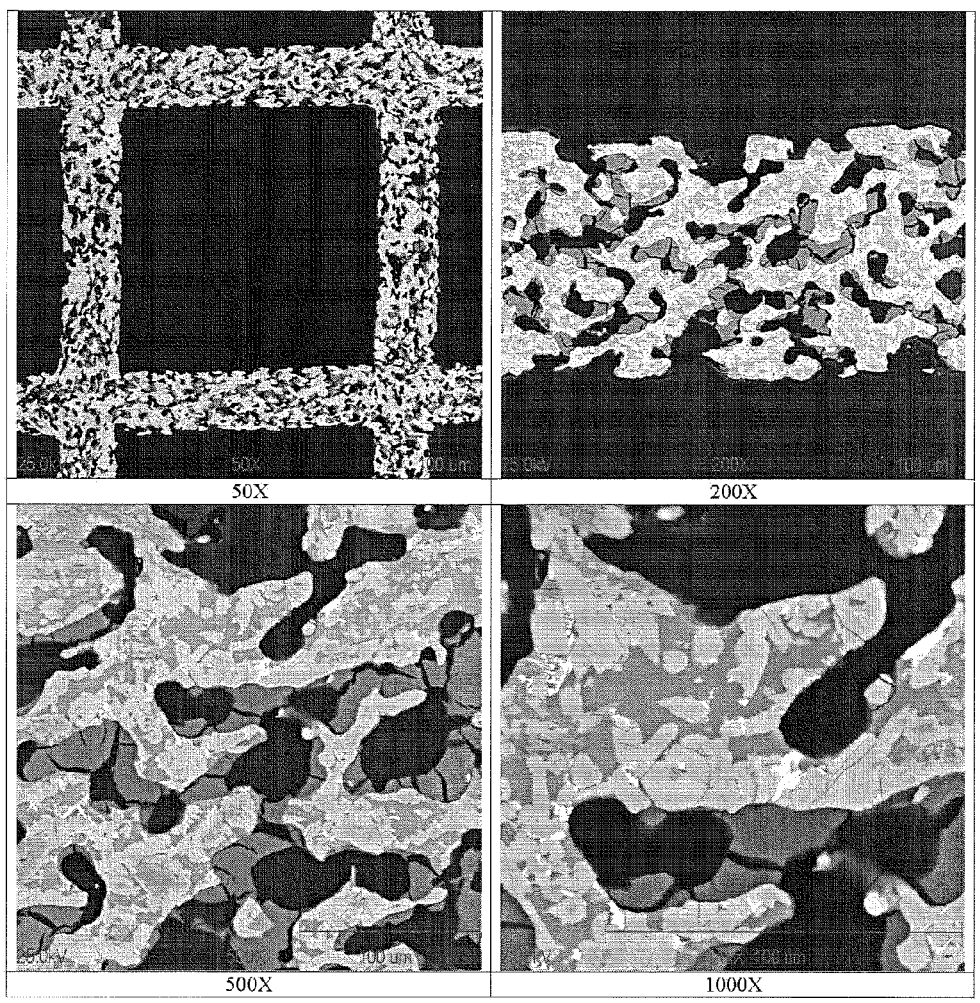
FIG. 6 depicts the microstructure of an inventive body with approximately 55 grams/liter of alumina washcoat.

The pressure drops of clean and soot-loaded filters formed of a representative cordierite aluminum magnesium titanate ceramic according to the invention and an aluminum titanate control ceramic were measured on the bare and catalyzed filters. The filter of the invention was of 300/12 cell geometry. Washcoating was done after a conventional preliminary polymer solution passivation, using AL-20 colloidal alumina for the washcoat. Representative results of such pressure drop testing are set forth in FIG. 5, wherein the % increase in pressure drop after washcoating is found to be lower for the filter of the invention than for the control aluminum titanate filter. The microstructure of the washcoated filter thus tested is shown in FIG. 6.

The data in Tables 3 to 11 and 13 further illustrate some of the exemplary ranges in properties that can be achieved with the inventive ceramic bodies of the current invention. Examples 1 to 7 in Table 3 represent the baseline quaternary three-phase composition (Tables 1 and 2) with no sintering additive. These examples show that low thermal expansion (6 to $20 \times 10^{-7}$/° C.) can be achieved with porosities (44-52%) and median pore diameters (15-27 μm) appropriate for application as a diesel particulate filter. The $d_f$ values range from 0.24 to 0.45. The optimum top firing temperature for these compositions is approximately 1355 to 1360° C. The coarser alumina used in Examples 4-7 results in higher pore size and lower firing shrinkage.

Examples 8 to 15 in Table 4 illustrate that the addition of about 2 wt. % $Y_2O_3$ to the base composition of Examples 1-3 allows a lower firing temperature, between 1290-1320° C., and a broader range of firing temperatures with high porosity (41-50%) and low thermal expansion (10 to $14 \times 10^{-7}$/° C.). Median pore diameters are 16 to 22 μm, and $d_f$ values are reduced to 0.17 to 0.31. The change in shrinkage with firing temperature is also lower. This allows a wider process window to achieve the desired properties. The optimum firing temperature is approximately 1310° C.

Examples 16 to 22 in Table 5 demonstrate that the addition of only about 1% $Y_2O_3$ super-addition to the base composition of Examples 1-3 reduces the firing temperature to 1310-1350° C., with the optimum being approximately 1320° C. The lower level of additive results in a firing temperature and firing process window that is intermediate between the basic quaternary composition and that for 2 wt. % additive. Physical properties are still excellent for a diesel particulate filter application.

Example 23 in Table 6 shows that the use of a finer, 10 μm, alumina powder results in a smaller pore size, slightly higher shrinkage, and slightly higher thermal expansion compared with Examples 8-15.

Examples 24 to 30 in Table 6 illustrate that the use of an alumina powder with coarser particle size results in larger pores, lower thermal expansion, and lower shrinkage compared to Examples 8-15. This composition has a very stable firing process window because of the coarse alumina and 2 wt. % yttria. This was a 2-inch diameter extrusion dried in a dielectric oven.

Examples 31 to 37 In Table 7 demonstrate compositions in which all of the magnesium was supplied by talc, and in which the alumina is of a finer particle size (~18 micron MPS). All have 1.9 wt. % yttria addition. Example 31 uses 15% potato starch. Example 32 uses 15% corn starch, which gives smaller pores but a very narrow pore size distribution. Example 33 contains 30% graphite and still provides a useful median pore diameter (12 μm) and narrow pore size distribution ($d_f$=0.29). Example 34 utilizes a mixture of corn starch and graphite to achieve good properties. Example 35 shows that coarser alumina and talc result in lower firing shrinkage on the same firing schedule and raise the pore size relative to Example 32. Example 36 made with green bean starch yields 15 micron pores and a very narrow pore-size distribution.

Example 37 using potato starch shows that coarser alumina and talc raise the pore size relative to Example 31.

Examples 38 to 50 in Tables 8 and 9 demonstrate a range of compositions of exemplary embodiments. Examples 38 to 50 illustrate that within these exemplary ranges of the embodiments, as well as modifying pore former, raw materials, firing temperature, and metal-oxide additive, as shown in the previous examples, the final porosity and pore size can be optimized for a particular application.

Examples 51-67 demonstrate that a sintering aid of cerium oxide, mixtures of cerium oxide and yttrium oxide, mixtures of cerium oxide, yttrium oxide, and lanthanum oxide, mixtures of cerium oxide and lanthanum oxide, or lanthanum oxide result in similar CTE, porosity, pore size, and pore size distribution at lower rare earth cost than yttrium oxide alone.

TABLE 3

| | Example Number | | | | | | |
|---|---|---|---|---|---|---|---|
| | 1 | 2 | 3 | 4 | 5 | 6 | 7 |
| Alumina A (24) | 44.76 | 44.76 | 44.76 | — | — | — | — |
| Alumina B (42) | — | — | — | 44.76 | 44.76 | 44.76 | 44.76 |
| Alumina C (10) | — | — | — | — | — | — | — |
| Alumina D (18) | — | — | — | — | — | — | — |
| Silica A (25) | — | — | — | — | — | — | — |
| Silica B (23) | 8.65 | 8.65 | 8.65 | 8.65 | 8.65 | 8.65 | 8.65 |
| Titania A (0.5) | 33.85 | 33.85 | 33.85 | 33.85 | 33.85 | 33.85 | 33.85 |
| Magnesia A (1.2) | 3.01 | 3.01 | 3.01 | 3.01 | 3.01 | 3.01 | 3.01 |
| Talc A (5.0) | 9.73 | 9.73 | 9.73 | 9.73 | 9.73 | 9.73 | 9.73 |
| Talc B (14.4) | — | — | — | — | — | — | — |
| Talc C (23) | — | — | — | — | — | — | — |
| $Y_2O_3$ | — | — | — | — | — | — | — |
| Graphite A (35) | 25.00 | 25.00 | 25.00 | 25.00 | 25.00 | 25.00 | 25.00 |
| Corn Starch (17) | — | — | — | — | — | — | — |
| Potato Starch (49) | — | — | — | — | — | — | — |
| First Soak Temperature (° C.) | 1320 | 1330 | 1335 | 1325 | 1330 | 1335 | 1340 |
| First Soak Time (hours) | 6 | 6 | 6 | 6 | 6 | 6 | 6 |
| Second Soak Temperature (° C.) | 1347 | 1357 | 1362 | 1352 | 1357 | 1362 | 1367 |
| Second Soak Time (hours) | 6 | 6 | 6 | 6 | 6 | 6 | 6 |
| Length Change after Firing (%) | 1.7 | −1.1 | −2.1 | 1.3 | 0.9 | 0.2 | −0.5 |
| CTE, 25-800° C. ($10^{-7}$/° C.) | 16.2 | 9.8 | 6.3 | 8.7 | 4.9 | 3.0 | 6.6 |
| CTE, 25-1000° C. ($10^{-7}$/° C.) | 19.5 | 12.6 | 9.1 | 12.1 | 8.4 | 6.2 | 10.0 |
| Maximum ΔL at 1000° C. (%) | 0.22 | 0.19 | 0.17 | 0.17 | 0.15 | 0.15 | 0.15 |
| % Porosity | 52.1 | 50.6 | 44.0 | 52.1 | 51.5 | 51.5 | 44.6 |
| $d_{50}$ (microns) | 14.5 | 15.1 | 16.1 | 23.2 | 23.5 | 22.5 | 27.3 |
| $(d_{50} - d_{10})/d_{50}$ | 0.45 | 0.44 | 0.27 | 0.42 | 0.38 | 0.38 | 0.24 |
| $(d_{90} - d_{10})/d_{50}$ | 1.16 | 1.08 | 1.01 | 1.26 | 1.09 | 1.45 | 1.19 |

TABLE 4

| | Example Number | | | | | | | |
|---|---|---|---|---|---|---|---|---|
| | 8 | 9 | 10 | 11 | 12 | 13 | 14 | 15 |
| Alumina A (24) | 43.90 | 43.90 | 43.90 | 43.90 | 43.90 | 43.90 | 43.90 | 43.90 |
| Alumina B (42) | — | — | — | — | — | — | — | — |
| Alumina C (10) | — | — | — | — | — | — | — | — |
| Alumina D (18) | — | — | — | — | — | — | — | — |
| Silica A (25) | — | — | — | — | — | — | — | — |
| Silica B (23) | 8.48 | 8.48 | 8.48 | 8.48 | 8.48 | 8.48 | 8.48 | 8.48 |
| Titania A (0.5) | 33.19 | 33.19 | 33.19 | 33.19 | 33.19 | 33.19 | 33.19 | 33.19 |
| Magnesia A (1.2) | 2.96 | 2.96 | 2.96 | 2.96 | 2.96 | 2.96 | 2.96 | 2.96 |
| Talc A (5.0) | 9.54 | 9.54 | 9.54 | 9.54 | 9.54 | 9.54 | 9.54 | 9.54 |
| Talc B (14.4) | — | — | — | — | — | — | — | — |
| Talc C (23) | — | — | — | — | — | — | — | — |
| $Y_2O_3$ | 1.94 | 1.94 | 1.94 | 1.94 | 1.94 | 1.94 | 1.94 | 1.94 |
| Graphite A (35) | 30.00 | 30.00 | 30.00 | 30.00 | 30.00 | 30.00 | 30.00 | 30.00 |
| Corn Starch (17) | — | — | — | — | — | — | — | — |
| Potato Starch (49) | — | — | — | — | — | — | — | — |
| First Soak Temperature (° C.) | 1275 | 1285 | 1290 | 1295 | 1305 | 1315 | 1320 | 1330 |
| First Soak Time (hours) | 6 | 6 | 6 | 6 | 6 | 6 | 6 | 6 |
| Second Soak Temperature (° C.) | 1302 | 1312 | 1317 | 1322 | 1332 | 1342 | 1347 | 1357 |
| Second Soak Time (hours) | 6 | 6 | 6 | 6 | 6 | 6 | 6 | 6 |

TABLE 4-continued

| | Example Number | | | | | | | |
|---|---|---|---|---|---|---|---|---|
| | 8 | 9 | 10 | 11 | 12 | 13 | 14 | 15 |
| Length Change after Firing (%) | −1.9 | −2.8 | −2.6 | −3.5 | −4.3 | −4.6 | −4.9 | −6.5 |
| CTE, 25-800° C. ($10^{-7}$/° C.) | 6.8 | 7.4 | 6.3 | 7.4 | 7.5 | 11.2 | 9.6 | 8.3 |
| CTE, 25-1000° C. ($10^{-7}$/° C.) | 10.2 | 10.8 | 10.0 | 10.8 | 11.3 | 13.9 | 13.5 | 11.7 |
| Maximum ΔL at 1000° C. (%) | 0.17 | 0.17 | 0.18 | 0.16 | 0.17 | 0.18 | 0.18 | 0.17 |
| % Porosity | 50.4 | 48.3 | 49.3 | 47.2 | 45.7 | 43.9 | 41.5 | 41.1 |
| $d_{50}$ (microns) | 16.0 | 17.0 | 16.6 | 18.0 | 20.1 | 22.0 | 20.2 | 21.6 |
| $(d_{50} - d_{10})/d_{50}$ | 0.31 | 0.27 | 0.30 | 0.23 | 0.21 | 0.17 | — | 0.17 |
| $(d_{90} - d_{10})/d_{50}$ | — | — | 0.75 | 0.60 | 0.71 | 0.79 | — | 0.87 |

TABLE 5

| | Example Number | | | | | | |
|---|---|---|---|---|---|---|---|
| | 16 | 17 | 18 | 19 | 20 | 21 | 22 |
| Alumina A (24) | 44.33 | 44.33 | 44.33 | 44.33 | 44.33 | 44.33 | 44.33 |
| Alumina B (42) | — | — | — | — | — | — | — |
| Alumina C (10) | — | — | — | — | — | — | — |
| Alumina D (18) | — | — | — | — | — | — | — |
| Silica A (25) | — | — | — | — | — | — | — |
| Silica B (23) | 8.56 | 8.56 | 8.56 | 8.56 | 8.56 | 8.56 | 8.56 |
| Titania A (0.5) | 33.52 | 33.52 | 33.52 | 33.52 | 33.52 | 33.52 | 33.52 |
| Magnesia A (1.2) | 2.99 | 2.99 | 2.99 | 2.99 | 2.99 | 2.99 | 2.99 |
| Talc A (5.0) | 9.63 | 9.63 | 9.63 | 9.63 | 9.63 | 9.63 | 9.63 |
| Talc B (14.4) | — | — | — | — | — | — | — |
| Talc C (23) | — | — | — | — | — | — | — |
| $Y_2O_3$ | 0.98 | 0.98 | 0.98 | 0.98 | 0.98 | 0.98 | 0.98 |
| Graphite A (35) | 30.00 | 30.00 | 30.00 | 30.00 | 30.00 | 30.00 | 30.00 |
| Corn Starch (17) | — | — | — | — | — | — | — |
| Potato Starch (49) | — | — | — | — | — | — | — |
| First Soak Temperature (° C.) | 1285 | 1290 | 1295 | 1305 | 1315 | 1320 | 1330 |
| First Soak Time (hours) | 6 | 6 | 6 | 6 | 6 | 6 | 6 |
| Second Soak Temperature (° C.) | 1312 | 1317 | 1322 | 1332 | 1342 | 1347 | 1357 |
| Second Soak Time (hours) | 6 | 6 | 6 | 6 | 6 | 6 | 6 |
| Length Change after Firing (%) | −0.9 | −0.3 | −1.1 | −2.6 | −3.7 | −3.9 | −5.1 |
| CTE, 25-800° C. ($10^{-7}$/° C.) | 11.3 | 11.6 | 8.4 | 8.4 | 7.2 | 6.3 | 10.8 |
| CTE, 25-1000° C. ($10^{-7}$/° C.) | 14.6 | 15.3 | 11.8 | 11.7 | 10.9 | 9.7 | 14.3 |
| Maximum ΔL at 1000° C. (%) | 0.19 | 0.20 | 0.17 | 0.18 | 0.17 | 0.18 | 0.18 |
| % Porosity | 51.3 | 51.9 | 50.5 | 51.1 | 43.9 | 43.9 | 42.5 |
| $d_{50}$ (microns) | 14.5 | 13.9 | 15.3 | 16.0 | 18.1 | 18.5 | 20.1 |
| $(d_{50} - d_{10})/d_{50}$ | 0.39 | 0.45 | 0.35 | 0.33 | 0.23 | 0.22 | 0.17 |
| $(d_{90} - d_{10})/d_{50}$ | 1.17 | 0.80 | 0.84 | 0.75 | 0.66 | 0.67 | 0.93 |

TABLE 6

| | Example Number | | | | | | | |
|---|---|---|---|---|---|---|---|---|
| | 23 | 24 | 25 | 26 | 27 | 28 | 29 | 30 |
| Alumina A (24) | — | — | — | — | — | — | — | — |
| Alumina B (42) | — | 43.90 | 43.90 | 43.90 | 43.90 | 43.90 | 43.90 | 43.90 |
| Alumina C (10) | 43.71 | — | — | — | — | — | — | — |
| Alumina D (18) | — | — | — | — | — | — | — | — |
| Silica A (25) | — | 8.48 | 8.48 | 8.48 | 8.48 | 8.48 | 8.48 | 8.48 |
| Silica B (23) | 8.49 | — | — | — | — | — | — | — |
| Titania A (0.5) | 33.36 | 33.19 | 33.19 | 33.19 | 33.19 | 33.19 | 33.19 | 33.19 |
| Magnesia A (1.2) | 2.96 | 2.96 | 2.96 | 2.96 | 2.96 | 2.96 | 2.96 | 2.96 |
| Talc A (5.0) | 9.54 | 9.54 | 9.54 | 9.54 | 9.54 | 9.54 | 9.54 | 9.54 |
| Talc B (14.4) | — | — | — | — | — | — | — | — |
| Talc C (23) | — | — | — | — | — | — | — | — |
| $Y_2O_3$ | 1.94 | 1.94 | 1.94 | 1.94 | 1.94 | 1.94 | 1.94 | 1.94 |
| Graphite A (35) | 25.00 | 30.00 | 30.00 | 30.00 | 30.00 | 30.00 | 30.00 | 30.00 |
| Corn Starch (17) | — | — | — | — | — | — | — | — |
| Potato Starch (49) | — | — | — | — | — | — | — | — |
| First Soak Temperature (° C.) | 1290 | 1250 | 1260 | 1270 | 1280 | 1290 | 1300 | 1290 |
| First Soak Time (hours) | 6 | 6 | 6 | 6 | 6 | 6 | 6 | 6 |
| Second Soak Temperature (° C.) | 1317 | 1277 | 1287 | 1297 | 1307 | 1317 | 1327 | 1317 |
| Second Soak Time (hours) | 6 | 6 | 6 | 6 | 6 | 6 | 6 | 6 |
| Length Change after Firing (%) | −3.1 | −1.9 | −2.0 | −1.6 | −2.1 | −1.8 | −1.8 | — |
| CTE, 25-800° C. ($10^{-7}$/° C.) | 7.2 | 9.0 | 6.8 | 6.3 | 4.1 | 3.3 | 3.0 | 5.1 |
| CTE, 25-1000° C. ($10^{-7}$/° C.) | 11.0 | 12.0 | 10.4 | 9.9 | 7.7 | 6.8 | 6.4 | 7.9 |

TABLE 6-continued

|  | Example Number | | | | | | | |
|---|---|---|---|---|---|---|---|---|
|  | 23 | 24 | 25 | 26 | 27 | 28 | 29 | 30 |
| Maximum ΔL at 1000° C. (%) | 0.18 | 0.17 | 0.16 | 0.16 | 0.15 | 0.13 | 0.14 | 0.13 |
| % Porosity | 47.0 | 46.6 | 48.3 | 45.6 | 47.6 | 46.0 | 44.0 | 46.4 |
| $d_{50}$ (microns) | 10.7 | 19.8 | 21.1 | 20.2 | 22.8 | 23.9 | 23.9 | 21.9 |
| $(d_{50} - d_{10})/d_{50}$ | 0.27 | 0.29 | 0.30 | 0.29 | 0.26 | 0.28 | 0.22 | 0.55 |
| $(d_{90} - d_{10})/d_{50}$ | 0.83 | 0.78 | 1.12 | 0.72 | 0.93 | 0.89 | 0.91 | 1.73 |

TABLE 7

|  | Example Number | | | | | | |
|---|---|---|---|---|---|---|---|
|  | 31 | 32 | 33 | 34 | 35 | 36 | 37 |
| Alumina A (24) | — | — | — | — | 43.51 | 43.51 | 43.51 |
| Alumina B (42) | — | — | — | — | — | — | — |
| Alumina C (10) | — | — | — | — | — | — | — |
| Alumina D (18) | 43.57 | 43.57 | 43.57 | 43.57 | — | — | — |
| Silica A (25) | 2.68 | 2.68 | 2.68 | 2.68 | 2.65 | 2.65 | 2.65 |
| Silica B (23) | — | — | — | — | — | — | — |
| Titania A (0.5) | 33.01 | 33.01 | 33.01 | 33.01 | 32.94 | 32.94 | 32.94 |
| Magnesia A (1.2) | — | — | — | — | — | — | — |
| Talc A (5.0) | — | — | — | — | — | — | — |
| Talc B (14.4) | 18.81 | 18.81 | 18.81 | 18.81 | — | — | — |
| Talc C (23) | — | — | — | — | 18.97 | 18.97 | 18.97 |
| $Y_2O_3$ | 1.93 | 1.93 | 1.93 | 1.93 | 1.93 | 1.93 | 1.93 |
| Graphite A (35) | — | — | 30.00 | 10.00 | — | — | — |
| Green Bean Starch | — | — | — | — | — | 15.00 | — |
| Corn Starch (17) | — | 15.00 | — | 10.00 | 15.00 | — | — |
| Potato Starch (49) | 15.00 | — | — | — | — | — | 15.00 |
| First Soak Temperature (° C.) | 1285 | 1285 | 1285 | 1285 | 1285 | 1285 | 1285 |
| First Soak Time (hours) | 6 | 6 | 6 | 6 | 6 | 6 | 6 |
| Second Soak Temperature (° C.) | 1312 | 1312 | 1312 | 1312 | 1312 | 1312 | 1312 |
| Second Soak Time (hours) | 6 | 6 | 6 | 6 | 6 | 6 | 6 |
| Length Change after Firing (%) | −1.1 | −1.6 | −2.5 | −1.6 | −0.3 | 0.1 | 0.3 |
| CTE, 25-800° C. ($10^{-7}$/° C.) | 6.0 | 7.1 | 6.1 | 6.7 | 8.9 | 7.4 | 7.2 |
| CTE, 25-1000° C. ($10^{-7}$/° C.) | 9.2 | 10.4 | 9.1 | 9.8 | 12.1 | 10.9 | 10.5 |
| Maximum ΔL at 1000° C. (%) | 0.15 | 0.15 | 0.16 | 0.15 | 0.16 | 0.15 | 0.15 |
| % Porosity | 48.4 | 44.4 | 46.7 | 44.7 | 46.5 | 47.1 | 49.1 |
| $d_{50}$ (microns) | 15.7 | 10.3 | 12.2 | 10.9 | 12.5 | 14.5 | 19.1 |
| $(d_{50} - d_{10})/d_{50}$ | 0.39 | 0.20 | 0.29 | 0.25 | 0.23 | 0.22 | 0.32 |
| $(d_{90} - d_{10})/d_{50}$ | 0.87 | 0.52 | 0.74 | 0.70 | 1.12 | 0.72 | 0.94 |

TABLE 8

|  | Example Number | | | | | | |
|---|---|---|---|---|---|---|---|
|  | 38 | 39 | 40 | 41 | 42 | 43 | 44 |
| Alumina A (24) | 42.17 | 42.17 | 45.61 | 45.61 | 45.61 | 45.61 | 42.17 |
| Silica B (23) | 11.93 | 11.93 | 18.26 | 18.26 | 11.48 | 11.48 | 15.13 |
| Titania B (8-16) | 39.13 | 39.13 | 29.62 | 29.62 | 37.24 | 37.24 | 35.55 |
| Magnesia A (1.2) | 6.77 | 6.77 | 6.51 | 6.51 | 5.67 | 5.67 | 7.15 |
| First Soak Temperature (° C.) | 1400 | 1375 | 1400 | 1375 | 1400 | 1375 | 1400 |
| First Soak Time (hours) | 8.00 | 8.00 | 8.00 | 8.00 | 8.00 | 8.00 | 8.00 |
| Length Change after Firing (%) | −9 | 0 | −7 | 1 | 2 | 1 | −3 |
| CTE, 25-800° C. ($10^{-7}$/° C.) | 1 | 7 | — | — | — | — | — |
| CTE, 25-1000° C. ($10^{-7}$/° C.) | 5 | 10 | 5 | 13 | 14 | 21 | 8 |
| Maximum ΔL at 1000° C. (%) | 0.19 | 0.19 | 0.17 | 0.16 | 0.16 | 0.23 | 0.12 |
| % Porosity | — | 40.6 | 19.38 | 40.28 | 32.33 | 42.33 | 26.88 |
| $d_{50}$ (microns) | — | 7.1 | 12.69 | 14.99 | 23.01 | 7.59 | 15.24 |

TABLE 9

|  | Example Number | | | | | |
|---|---|---|---|---|---|---|
|  | 45 | 46 | 47 | 48 | 49 | 50 |
| Alumina A (24) | 42.17 | 42.17 | 42.17 | 44.00 | 48.00 | 48.00 |
| Silica B (23) | 15.13 | 8.49 | 8.49 | 6.84 | 9.42 | 12.83 |
| Titania B (8-16) | 35.55 | 41.42 | 41.42 | 43.52 | 37.84 | 33.99 |

TABLE 9-continued

| | Example Number | | | | | |
|---|---|---|---|---|---|---|
| | 45 | 46 | 47 | 48 | 49 | 50 |
| Magnesia A (1.2) | 7.15 | 7.92 | 7.92 | 5.64 | 4.74 | 5.18 |
| First Soak Temperature (° C.) | 1375 | 1400 | 1375 | 1400 | 1400 | 1400 |
| First Soak Time (hours) | 8.00 | 8.00 | 8.00 | 8.00 | 8.00 | 8.00 |
| Length Change after Firing (%) | 2 | −11 | −1 | −7 | 3 | −2 |
| CTE, 25-800° C. ($10^{-7}$/° C.) | — | — | — | — | — | — |
| CTE, 25-1000° C. ($10^{-7}$/° C.) | 20 | 5 | 15 | 4 | 13 | 11 |
| Maximum ΔL at 1000° C. (%) | 0.23 | 0.13 | 0.22 | 0.16 | 0.18 | 0.17 |
| % Porosity | 37.30 | 14.63 | 36.63 | 24.65 | 34.22 | 35.26 |
| $d_{50}$ (microns) | 10.26 | 0.47 | 7.14 | 6.83 | 9.46 | 14.42 |

Examples 51-54 in Tables 10 and 11 are comparative examples including yttrium oxide. Examples 55-58 include cerium oxide. Examples 59 and 60 contain both yttrium oxide and cerium oxide. The formulation of these examples is shown in Tables 10 and 11. Examples 51-60 all used 4% graphite and 22% starch (added as a superaddition to the inorganic materials in Tables 10 and 11), and 4.5% methylcellulose and 1% tall oil added as superadditions to all the other batch components. These examples were mixed with deionized water, extruded into a cellular structure with 300 cells per square inch and 330 μm (13 mil) wall thickness, dried and fired in gas-fired kilns to 1350° C. for 16 hours. The properties of the fired ware for Examples 51-60 are shown in Tables 10 and 11 along with a relative cost estimate for the additive based on current market prices normalized to the cost of 1% $Y_2O_3$.

Table 12 lists some representative prices of rare-earth materials, which are at least a factor of 10 higher than all the other batch materials.

Figure 7:
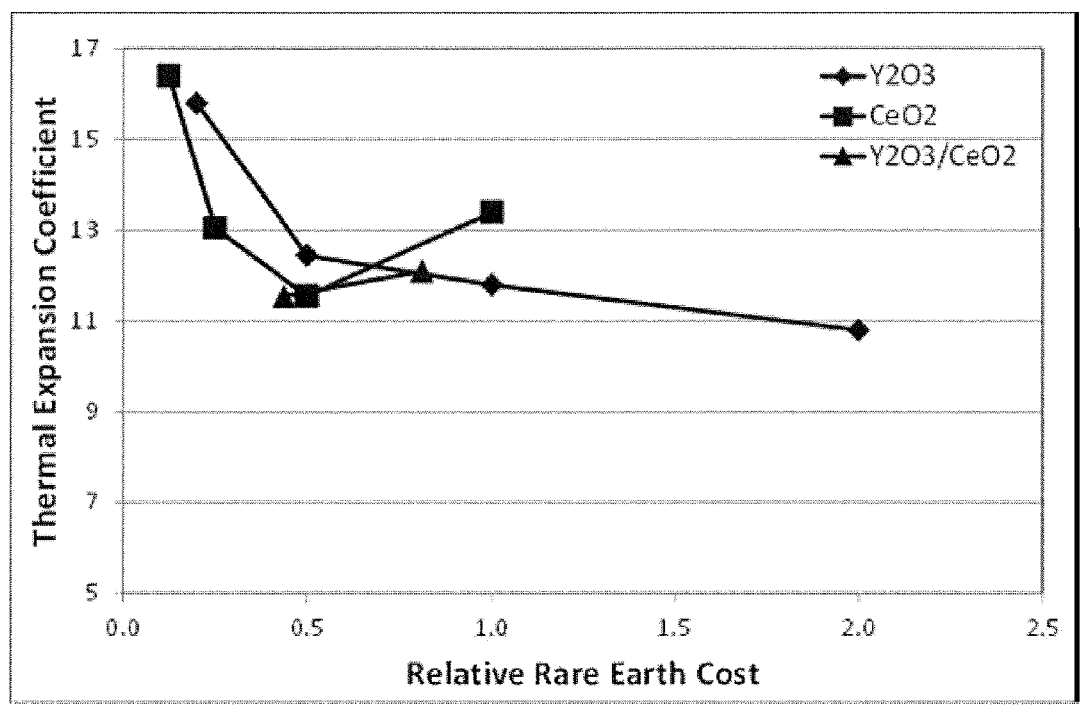
FIG. 7 shows the coefficient of thermal expansion (CTE) as a function of relative rare earth cost (1% $Y_2O_3$=1) for exemplary embodiments of the invention.

FIG. 7 shows the coefficient of thermal expansion (CTE) as a function of relative rare earth cost (1% $Y_2O_3$=1) for the comparative Examples 51-54 and the Examples 55-60 of Tables 10 and 11. As FIG. 7 illustrates, the cost to attain a CTE below a given value, for example, below 12*$10^{-7}$/° C. is lower for cerium oxide or yttrium oxide and cerium oxide mixtures than for yttrium oxide alone while retaining similar pore size, porosity and pore size distribution (Tables 10 and 11). The rare earth cost reduction possible is at least 50% using this metric.

These lower cost compositions show similar stability of properties with firing temperature as the higher-cost compositions. Table 13 shows the properties of Examples 52, 53, 56, and 60 after firing for 12 hours at 1320, 1330, 1340, 1350 and 1360° C. in an electric kiln.

TABLE 10

| | Example Number | | | | | | |
|---|---|---|---|---|---|---|---|
| | 51 | 52 | 53 | 54 | 55 | 56 | 57 |
| Alumina A (24) | — | — | — | — | — | — | — |
| Alumina B (42) | — | — | — | — | — | — | — |
| Alumina C (10) | 44.31 | 44.18 | 43.97 | 43.54 | 44.18 | 43.97 | 43.54 |
| Alumina D (18) | — | — | — | — | — | — | — |
| Silica A (25) | — | — | — | — | — | — | — |
| Silica B (23) | 2.72 | 2.71 | 2.69 | 2.67 | 2.71 | 2.69 | 2.67 |
| Titania A (0.5) | 33.62 | 33.52 | 33.36 | 33.03 | 33.52 | 33.36 | 33.03 |
| Magnesia A (1.2) | | | | | | | |
| Talc A (5.0) | 19.16 | 19.10 | 19.01 | 18.82 | 19.10 | 19.01 | 18.82 |
| Talc B (14.4) | — | — | — | — | — | — | — |
| Talc C (23) | — | — | — | — | — | — | — |
| $Y_2O_3$ | 0.20 | 0.50 | 1.00 | 2.00 | — | — | — |
| $CeO_2$ | — | — | — | — | 0.50 | 1.00 | 2.00 |
| Graphite A (35) | 4.0 | 4.0 | 4.0 | 4.0 | 4.0 | 4.0 | 4.0 |
| Corn Starch (17) | — | — | — | — | — | — | — |
| Potato Starch (49) | 22 | 22 | 22 | 22 | 22 | 22 | 22 |
| First Soak Temperature (° C.) | 1350 | 1350 | 1350 | 1350 | 1350 | 1350 | 1350 |
| First Soak Time (hours) | 16 | 16 | 16 | 16 | 16 | 16 | 16 |
| Length Change after Firing (%) | −2.0 | −2.7 | −2.8 | −3.7 | −2.1 | −2.7 | −3.7 |
| CTE, 25-800° C. ($10^{-7}$/° C.) | 12.8 | 9.6 | 9.2 | 8.2 | 13.3 | 10.1 | 8.6 |
| CTE, 25-1000° C. ($10^{-7}$/° C.) | 15.8 | 12.5 | 11.8 | 10.8 | 16.4 | 13.1 | 11.6 |
| % Porosity | 55 | 53 | 52 | 52 | 55 | 53 | 53 |
| $d_{50}$ (microns) | 11 | 12 | 14 | 12 | 13 | 13 | 14 |
| $(d_{50} - d_{10})/d_{50}$ | 0.28 | 0.22 | 0.17 | 0.16 | 0.21 | 0.19 | 0.16 |
| $(d_{90} - d_{10})/d_{50}$ | 0.52 | 0.46 | 0.36 | 0.35 | 0.44 | 0.38 | 0.35 |
| Relative RE Cost | 0.20 | 0.50 | 1.00 | 2.00 | 0.13 | 0.25 | 0.50 |

TABLE 11

| | Example Number | | |
|---|---|---|---|
| | 58 | 59 | 60 |
| Alumina A (24) | — | — | — |
| Alumina B (42) | — | — | — |
| Alumina C (10) | 42.72 | 43.97 | 43.97 |
| Alumina D (18) | — | — | — |
| Silica A (25) | — | — | — |
| Silica B (23) | 2.62 | 2.69 | 2.69 |
| Titania A (0.5) | 32.41 | 33.36 | 33.36 |

TABLE 11-continued

| | Example Number | | |
|---|---|---|---|
| | 58 | 59 | 60 |
| Magnesia A (1.2) | — | — | — |
| Talc A (5.0) | 18.47 | 19.01 | 19.01 |
| Talc B (14.4) | — | — | — |
| Talc C (23) | — | — | — |
| $Y_2O_3$ | — | 0.75 | 0.25 |
| $CeO_2$ | 4.00 | 0.25 | 0.75 |
| Graphite A (35) | 4.0 | 4.0 | 4.0 |
| Corn Starch (17) | — | — | — |
| Potato Starch (49) | 22 | 22 | 22 |
| First Soak Temperature (° C.) | 1350 | 1350 | 1350 |
| First Soak Time (hours) | 16 | 16 | 16 |
| Length Change after Firing (%) | −4.5 | −3.1 | −3.2 |
| CTE, 25-800° C. ($10^{-7}$/° C.) | 10.4 | 9.1 | 8.5 |
| CTE, 25-1000° C. ($10^{-7}$/° C.) | 13.4 | 12.1 | 8.5 |
| % Porosity | 50 | 54 | 53 |
| $d_{50}$ (microns) | 17 | 13 | 13 |
| $(d_{50} - d_{10})/d_{50}$ | 0.16 | 0.22 | 0.19 |
| $(d_{90} - d_{10})/d_{50}$ | 0.32 | 0.42 | 0.43 |
| Relative RE Cost | 1.00 | 0.81 | 0.44 |

TABLE 12

| Metal | Cost in March, 2012 ($/kg) | Cost in December, 2011 ($/kg) |
|---|---|---|
| Lanthanum Oxide ≥ 99.5% | 19 | 35 |
| Cerium Oxide ≥ 99.5% | 16 | 30 |
| Yttrium Oxide ≥ 99.99% | 95 | 95 |

TABLE 13

| Example Number | Firing Temperature (C.) | Soak time | Arch Porosity | d50 | df | db | CTE 800 | CTE 1000 | Firing Length Change |
|---|---|---|---|---|---|---|---|---|---|
| 52 | 1320 | 12 | 54 | 12 | 0.21 | 0.47 | 14.6 | 17.7 | −1.3 |
| 52 | 1330 | 12 | 55 | 12 | 0.22 | 0.48 | 12.4 | 15.7 | −1.5 |
| 52 | 1340 | 12 | 55 | 13 | 0.20 | 0.44 | 13.4 | 16.8 | −1.2 |
| 52 | 1350 | 12 | 54 | 14 | 0.16 | 0.41 | 12.9 | 15.9 | −1.3 |
| 52 | 1360 | 12 | 50 | 15 | 0.15 | 0.42 | 12.4 | 15.4 | −3.3 |
| 53 | 1320 | 12 | 54 | 13 | 0.16 | 0.39 | 11.7 | 14.9 | −1.9 |
| 53 | 1330 | 12 | 54 | 13 | 0.18 | 0.37 | 10.9 | 14.0 | −2.1 |
| 53 | 1340 | 12 | 54 | 14 | 0.16 | 0.36 | 11.7 | 14.6 | −1.6 |
| 53 | 1350 | 12 | 51 | 15 | 0.15 | 0.39 | 12.0 | 15.1 | −3.2 |
| 53 | 1360 | 12 | 48 | 16 | 0.14 | 0.43 | 13.0 | 16.2 | −5.5 |
| 56 | 1320 | 12 | 54 | 13 | 0.18 | 0.36 | 16.3 | 19.4 | −2.4 |
| 56 | 1330 | 12 | 55 | 14 | 0.17 | 0.37 | 14.7 | 18.0 | −1.5 |
| 56 | 1340 | 12 | 54 | 15 | 0.15 | 0.35 | 14.2 | 17.5 | −1.1 |
| 56 | 1350 | 12 | 54 | 15 | 0.20 | 0.39 | 15.1 | 18.0 | −2.0 |
| 56 | 1360 | 12 | 49 | 16 | 0.23 | 0.48 | 13.3 | 16.4 | −5.1 |
| 60 | 1320 | 12 | 54 | 13 | 0.17 | 0.35 | 13.4 | 16.8 | −2.3 |
| 60 | 1330 | 12 | 54 | 14 | 0.14 | 0.34 | 13.1 | 16.3 | −2.5 |
| 60 | 1340 | 12 | 54 | 14 | 0.15 | 0.36 | 12.0 | 15.2 | −1.9 |
| 60 | 1350 | 12 | 52 | 15 | 0.17 | 0.40 | 12.6 | 15.8 | −2.9 |
| 60 | 1360 | 12 | 47 | 15 | 0.18 | 0.43 | 13.3 | 16.5 | −6.5 |

Examples 61-68 were made by dry-blending a large batch of the composition shown in Table 14 and adding the additions shown in Table 15 and dry-blending again. The powder for each batch was pressed in a die to form a 8×8×65 mm bar before firing. Tables 16 to 18 provide data for the inventive examples fabricated according to the general composition of Tables 14 and 15. The data parameters provided are as described above for Tables 3 to 11 and 13. Examples 61 to 68 were prepared as described above for Examples 1-60.

Examples 61 and 62 in Table 16 use cerium oxide as a sintering aid. Examples 63-67, shown in Table 16 use lanthanum oxide ($La_2O_3$) or mixtures of $La_2O_3$ with cerium oxide. Comparative example 68 in Table 16 uses the batch composition with no sintering aid additive. Properties for Examples 61-67 after firing at 1330° C. for 12 hours in an electric kiln are shown in Table 16. These results are similar to $CeO_2$ or $Y_2O_3$ alone, but with an approximately $3*10^{-7}$/° C. higher thermal expansion coefficient than with $CeO_2$ or $Y_2O_3$ alone.

Examples 69-84 in Table 17 use yttrium oxide, cerium oxide, or lanthanum oxide as a sintering aid. Examples 69-77, shown in Table 17 use yttrium oxide as the sintering aid. Examples 78-83 shown in Table 17 use cerium oxide as the sintering aid. Example 84 uses lanthanum oxide as the sintering aid. Examples 78-84 exhibit acceptable porosity, pore size distribution, CTE values, and firing window properties compared to yttrium oxide alone and at a lower relative rare earth cost compared to yttrium oxide alone.

Table 18 shows the properties as a function of firing temperature with a 16 hour hold time for Examples 61 and 68 showing that $CeO_2$ provides a wide firing window.

Table 19 includes analyzed phases and pseudobrookite composition in wt % as determined by X-Ray Diffraction (XRD) for Examples 53, 54, 57, and 58. These analyzed examples were all fired at 1365° C. The pseudobrookite composition was determined by the lattice parameters of the pseudobrookite phase as determined by XRD. The phase distribution was determined by Rietveld refinement of the XRD pattern.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

TABLE 14

| Alumina | 44.42 |
|---|---|
| Quartz | 2.73 |
| Titania | 33.66 |

TABLE 14-continued

| | |
|---|---|
| Talc | 19.19 |
| Starch | 19.00 |
| Graphite | 8.00 |

TABLE 15

| Example | Baseline Batch (%) | CeO$_2$ | La$_2$O$_3$ |
|---|---|---|---|
| 61 | 99.228 | 0.772 | — |
| 62 | 98.847 | 1.153 | — |

TABLE 15-continued

| Example | Baseline Batch (%) | CeO$_2$ | La$_2$O$_3$ |
|---|---|---|---|
| 63 | 98.847 | 0.865 | 0.288 |
| 64 | 98.847 | 0.577 | 0.577 |
| 65 | 98.847 | 0.288 | 0.865 |
| 66 | 98.847 | 0.000 | 1.153 |
| 67 | 99.420 | 0.000 | 0.580 |
| 68 | 100.000 | 0.000 | 0.000 |

TABLE 16

| | Example Number | | | | | | | |
|---|---|---|---|---|---|---|---|---|
| | 61 | 62 | 63 | 64 | 65 | 66 | 67 | 68 |
| CeO$_2$ | 1.00 | 1.50 | 1.13 | 0.75 | 0.38 | 0.00 | 0.00 | — |
| La$_2$O$_3$ | 0.00 | 0.00 | 0.38 | 0.75 | 1.13 | 1.50 | 0.75 | — |
| Length Change after Firing (%) | 0.03 | −0.26 | — | — | — | — | — | — |
| CTE, 25-800° C. (10$^{-7}$/° C.) | 13 | 11 | — | — | — | — | — | — |
| CTE, 25-1000° C. (10$^{-7}$/° C.) | 16 | 14 | 16 | 18 | 17 | 18 | 21 | — |
| % Porosity | 50 | 50 | 50 | 51 | 50 | 51 | 51 | — |
| d$_{50}$ (microns) | 13 | 13 | 13 | 13 | 13 | 13 | 12 | — |
| (d$_{50}$ − d$_{10}$)/d$_{50}$ | 0.23 | 0.17 | 0.20 | 0.23 | 0.20 | 0.23 | 0.28 | — |
| (d$_{90}$ − d$_{10}$)/d$_{50}$ | 0.37 | 0.29 | | | | | | |
| Relative RE Cost | 0.250 | 0.375 | | | | | | |

TABLE 17

| | Example Number | | | | | | | |
|---|---|---|---|---|---|---|---|---|
| | 69 | 70 | 71 | 72 | 73 | 74 | 75 | 76 |
| Alumina A (24) | 44.18 | — | 44.18 | 44.18 | 44.18 | — | — | — |
| Alumina B (42) | — | — | — | — | — | 44.18 | 44.18 | 44.18 |
| Alumina C (10) | — | 44.18 | — | — | — | — | — | — |
| Silica C (25) | 2.71 | 2.17 | 2.71 | 2.71 | 2.71 | 2.71 | 2.71 | 2.71 |
| Titania A (0.5) | 33.52 | 33.52 | 33.52 | 33.52 | 33.52 | 33.52 | 33.52 | 33.52 |
| Talc B (14.4) | 19.10 | 19.10 | 19.10 | 19.10 | 19.10 | 19.10 | 19.10 | 19.10 |
| Y$_2$O$_3$ | 0.49 | 0.74 | 0.49 | 0.49 | 0.49 | 0.49 | 0.49 | 0.49 |
| CeO$_2$ | — | — | — | — | — | — | — | — |
| La$_2$O$_3$ | — | — | — | — | — | — | — | — |
| Graphite A (35) | 14 | 8 | 14 | 10 | 14 | 8 | 8 | 8 |
| Potato Starch (49) | 30 | 19 | 32 | 30 | 32 | 27 | 27 | 27 |
| First Soak Temperature (° C.) | 1351 | 1358 | 1349 | 1345 | 1351 | 1358 | 1355 | 1365 |
| First Soak Time (hours) | 16 | 16 | 16 | 16 | 16 | 16 | 16 | 16 |
| Length Change after Firing (%) | −0.28 | −1.11 | −1.33 | −1.55 | −1.89 | −2.02 | −2.5 | −2.71 |
| CTE, 25-800° C. (10$^{-7}$/° C.) | 12.9 | 8.1 | 11.7 | 9.6 | 13.25 | 10.8 | 9.7 | 11.7 |
| CTE, 25-1000° C. (10$^{-7}$/° C.) | 16.1 | 11.3 | 14.9 | 13.2 | 16.3 | 13.9 | 14.1 | 14.4 |
| % Porosity | 63.3 | 55.41 | 63.5 | 59.85 | 61.65 | 57.18 | 56 | 57.64 |
| d$_{50}$ (microns) | 16.24 | 13.14 | 17.6 | 17.15 | 17.16 | 19.63 | 18.93 | 17.81 |
| (d$_{50}$ − d$_{10}$)/d$_{50}$ | 0.21 | 0.22 | 0.35 | 0.41 | 0.63 | 0.24 | 0.23 | 0.16 |
| (d$_{90}$ − d$_{10}$)/d$_{50}$ | 0.53 | 0.44 | 0.82 | 0.78 | 0.76 | 0.70 | 0.54 | 0.39 |

| | Example Number | | | | | | | |
|---|---|---|---|---|---|---|---|---|
| | 77 | 78 | 79 | 80 | 81 | 82 | 83 | 84 |
| Alumina A (24) | 44.18 | 44.18 | 44.18 | 44.05 | 43.97 | 43.97 | 43.97 | 44.18 |
| Alumina B (42) | — | — | — | — | — | — | — | — |
| Alumina C (10) | — | — | — | — | — | — | — | — |
| Silica C (25) | 2.71 | 2.71 | 2.71 | 2.7 | 2.70 | 2.70 | 2.70 | 2.71 |
| Titania A (0.5) | 33.52 | 33.52 | 33.49 | 33.42 | 33.36 | 33.36 | 33.36 | 33.52 |
| Talc B (14.4) | 19.10 | 19.10 | 19.08 | 19.05 | 19.01 | 19.01 | 19.01 | 19.10 |
| Y$_2$O$_3$ | 0.49 | — | — | — | — | — | — | — |
| CeO$_2$ | — | 0.96 | 0.59 | 0.78 | 0.975 | 0.98 | 0.98 | — |
| La$_2$O$_3$ | — | — | — | — | — | — | — | 0.96 |
| Graphite A (35) | 10 | 14 | 10 | 10 | 10 | 10 | 10 | 14 |
| Potato Starch (49) | 30 | 32 | 30 | 30 | 30 | 30 | 30 | 32 |
| First Soak Temperature (° C.) | 1355 | 1351 | 1345 | 1345 | 1345 | 1345 | 1345 | 1346 |
| First Soak Time (hours) | 16 | 16 | 16 | 16 | 16 | 16 | 16 | 16 |

TABLE 17-continued

| | | | | | | | |
|---|---|---|---|---|---|---|---|
| Length Change after Firing (%) | −2.72 | −1.31 | −1.39 | −1.5 | −1.51 | −1.81 | −2.19 | −1.77 |
| CTE, 25-800° C. ($10^{-7}$/° C.) | — | 11.7 | 12.1 | 11 | 11.6 | 10.4 | 10.7 | 14.7 |
| CTE, 25-1000° C. ($10^{-7}$/° C.) | — | 15 | 15.9 | 14.6 | 15.2 | 14 | 14.2 | 17.9 |
| % Porosity | — | 63.06 | 59.58 | 59.52 | 61 | 59.73 | 59.24 | — |
| $d_{50}$ (microns) | — | 18.9 | 17.12 | 17.45 | 15.91 | 17.66 | 17.8 | — |
| $(d_{50} - d_{10})/d_{50}$ | — | 0.28 | 0.35 | 0.36 | 0.18 | 0.32 | 0.33 | — |
| $(d_{90} - d_{10})/d_{50}$ | — | 0.71 | 0.70 | 0.70 | 0.41 | 0.68 | 0.65 | — |

TABLE 18

| | Porosity (%) | | $d_{50}$ (microns) | | CTE 800 | | CTE 1000 | |
|---|---|---|---|---|---|---|---|---|
| | | 68 | | 68 | | 68 | | 68 |
| | 61 | 1% | 61 | 1% | 61 | 1% | 61 | 1% |
| Temperature | None | $CeO_2$ | None | $CeO_2$ | None | $CeO_2$ | None | $CeO_2$ |
| 1310 | 51 | 51 | 9 | 11 | 23.0 | 11.5 | 26 | 15 |
| 1320 | 52 | 52 | 9 | 12 | 21.4 | 11.2 | 25 | 15 |
| 1330 | 53 | 51 | 10 | 12 | 20.9 | 10.5 | 24 | 14 |
| 1340 | 54 | 51 | 10 | 12 | 18.7 | 10.5 | 22 | 14 |
| 1350 | 53 | 51 | 11 | 13 | 17.4 | 9.9 | 21 | 13 |
| 1360 | 54 | — | 11 | — | 15.1 | −6.9 | 18 | — |
| 1370 | 52 | — | 13 | — | 12.6 | — | 16 | — |

| | dbreadth | | dfactor | | Firing Length Change | |
|---|---|---|---|---|---|---|
| | | 68 | | 68 | | 68 |
| | 61 | 1% | 61 | 1% | 61 | 1% |
| Temperature | None | $CeO_2$ | None | $CeO_2$ | None | $CeO_2$ |
| 1310 | 0.66 | 0.39 | 0.49 | 0.29 | −0.2 | −0.2 |
| 1320 | 0.69 | 0.42 | 0.47 | 0.29 | 0.3 | 0.0 |
| 1330 | 0.65 | 0.38 | 0.48 | 0.26 | 0.9 | −0.1 |
| 1340 | 0.61 | 0.37 | 0.44 | 0.25 | 1.4 | −0.1 |
| 1350 | 0.56 | 0.32 | 0.39 | 0.21 | 1.5 | −0.3 |
| 1360 | 0.48 | 0.38 | 0.32 | — | 1.4 | — |
| 1370 | 0.39 | — | 0.26 | — | 0.5 | — |

TABLE 19

| Example Number | Pseudobrookite | Corundum | Cordierite | Mullite | $Y_2Ti_2O_7$ | $CeO_2$ | $Al_{2(1-x)}Mg_xTi_{(1+x)}O_5$ Value of x |
|---|---|---|---|---|---|---|---|
| 53 | 65 | 3 | 16 | 16 | 0.4 | 0.0 | 0.19 |
| 54 | 65 | 1 | 13 | 20 | 1.3 | 0.0 | 0.19 |
| 57 | 67 | 1 | 14 | 18 | 0.0 | 0.0 | 0.19 |
| 58 | 67 | 1 | 10 | 20 | 0.0 | 1.5 | 0.19 |

The invention claimed is:

1. A ceramic article comprising a first crystalline phase comprised predominantly of a solid solution of aluminum titanate and magnesium dititanate and a second crystalline phase comprising cordierite, the article having a composition, as expressed in weight percent on an oxide basis of from 4 to 10% MgO; from 40 to 55% $Al_2O_3$; from 25 to 44% $TiO_2$; from 5 to 25% $SiO_2$, and a sintering aid, the sintering aid comprising at least one of a lanthanide oxide and yttrium oxide.

2. The ceramic article of claim 1, wherein the lanthanide oxide comprises a cerium oxide.

3. The ceramic article of claim 1, wherein the sintering aid comprises cerium oxide and at least one of yttrium oxide and a lanthanum oxide.

4. The ceramic article of claim 1 comprising a composition expressed on an oxide basis of: $a(Al_2TiO_5)+b(MgTi_2O_5)+c(2MgO.2Al_2O_3.5SiO_2)+d(3Al_2O_3.2SiO_2)+e(MgO.Al_2O_3)+f(2MgO.TiO_2)+g(X)+i(Fe_2O_3 \cdot TiO_2)+j(TiO_2)+k(Al_2O_3)$, wherein a, b, c, d, e, f, g, h, i, j, and k are weight fractions of each component such that (a+b+c+d+e+f+g+h+i+j+k)=1.00, wherein X is the sintering aid.

5. The ceramic article of claim 4, wherein 0.3≤a≤0.75, 0.075≤b≤0.3, 0.02≤c≤0.5, and 0.001≤g≤0.05.

6. The ceramic article of claim 5, wherein 0.3≤a≤0.75, 0.075≤b≤0.3, 0.02≤c≤0.5, 0.0≤d≤0.4, 0.0≤e≤0.25, 0.0≤f≤0.1, 0.001≤g≤0.05, 0.0≤i≤0.05, 0.0≤j≤0.2 and 0.0≤k≤0.1.

7. The ceramic article of claim 5, wherein 0.0025≤g≤0.02.

8. The ceramic article of claim 4, wherein the sintering aid comprises a cerium oxide.

9. The ceramic article of claim 8, wherein the sintering aid further comprises at least one of yttrium oxide and lanthanum oxide.

10. The ceramic article of claim 1, wherein the ceramic article comprises a total porosity % P greater than 40% by volume.

11. The ceramic article of claim 10, wherein the ceramic article comprises a coefficient of thermal expansion, as measured between 25-1000° C., less than or equal to $14 \times 10^{-7}$/° C.

12. The ceramic article of claim 1, wherein the sintering aid is present, on a weight percent oxide basis, in an amount in the range of from greater than 0.1 to 5 weight % relative to the total weight of the inorganic batch composition.

13. The ceramic article of claim 1 having a composition, as expressed in weight percent on an oxide basis: of from 5 to 10% MgO; from 40 to 50% $Al_2O_3$; from 30 to 35% $TiO_2$; and from 10 to 20% $SiO_2$.

14. The ceramic article of claim 1, comprising a median pore size $d_{50}$ in the range of from 10 μm to 30 μm.

15. The ceramic article of claim 14, comprising a median pore size $d_{50}$ in the range of from 15 μm to 25 μm.

16. A diesel particulate filter comprising the ceramic article of claim 1, wherein said diesel particulate filter comprises a honeycomb structure having a plurality of axially extending end-plugged inlet and outlet cells.

17. A ceramic article, comprising:
   at least about 50 wt % of a pseudobrookite phase comprising predominantly alumina, magnesia, and titania;
   a second phase comprising cordierite; and
   a sintering aid, comprising at least one of a lanthanide oxide and yttrium oxide.

18. The ceramic article of claim 17, wherein the lanthanide oxide comprises a cerium oxide.

19. The ceramic article of claim 17, wherein the sintering aid comprises cerium oxide and at least one of yttrium oxide and a lanthanum oxide.

20. A method of manufacturing a ceramic article, comprising:
 providing an inorganic batch composition comprising a magnesia source, a silica source, an alumina source, a titania source, and at least one sintering aid;
 mixing the inorganic batch composition together with one or more processing aid selected from the group consisting of a plasticizer, lubricant, binder, pore former, and solvent, to form a plasticized ceramic precursor batch composition;
 shaping the plasticized ceramic precursor batch composition into a green body; and
 firing the green body under conditions effective to convert the green body into a ceramic article comprising a pseudobrookite phase comprising predominately alumina, magnesia, and titania and a second phase comprising cordierite,
 wherein the sintering aid comprises at least one of a lanthanide oxide and yttrium oxide.

21. The method of claim 20, wherein the lanthanide oxide comprises a cerium oxide.

22. The method of claim 21, wherein the sintering aid comprises cerium oxide and at least one of yttrium oxide and a lanthanum oxide.

23. The method of claim 20, wherein at least one sintering aid is present, on a weight percent oxide basis, in an amount in the range of from greater than 0.1 to 5 weight % relative to the total weight of the inorganic batch composition.

24. The method of claim 20, wherein the plasticized ceramic precursor batch composition is shaped by extrusion.

25. The method of claim 20, wherein the firing conditions effective to convert the green body into a ceramic article comprise heating the green body at a maximum soak temperature in the range of from 1250° C. to 1450° C. and maintaining the maximum soak temperature for a hold time sufficient to convert the green body into a ceramic article.

* * * * *

UNITED STATES PATENT AND TRADEMARK OFFICE
CERTIFICATE OF CORRECTION

PATENT NO. : 8,956,436 B2
APPLICATION NO. : 13/676567
DATED : February 17, 2015
INVENTOR(S) : Divens-Dutcher et al.

Page 1 of 1

It is certified that error appears in the above-identified patent and that said Letters Patent is hereby corrected as shown below:

Title Page, Item (72) Inventors, should read

--(72) Inventors: Adriane Marie Divens-Dutcher, Painted Post, NY (US); Patrick David Tepesch, Corning, NY (US); Elizabeth Marie Vileno, Corning, NY (US); Gregory Albert Merkel, Corning, NY (US); Raja Rao Wuirika, Painted Post, NY (US)--.

Signed and Sealed this
Eighth Day of March, 2016

Michelle K. Lee
*Director of the United States Patent and Trademark Office*